(12) United States Patent
Caumartin et al.

(10) Patent No.: US 11,359,681 B2
(45) Date of Patent: Jun. 14, 2022

(54) CLUTCH MECHANISM COMPRISING TWO ASSEMBLIES CONNECTED BY AN ASSEMBLING DEVICE

(71) Applicant: VALEO EMBRAYAGES, Amiens (FR)

(72) Inventors: Laurent Caumartin, Amiens (FR); Rabah Arhab, Amiens (FR); Herve Ribot, Amiens (FR); David Delplace, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 129 days.

(21) Appl. No.: 16/618,305

(22) PCT Filed: May 24, 2018

(86) PCT No.: PCT/EP2018/063731
§ 371 (c)(1),
(2) Date: Nov. 29, 2019

(87) PCT Pub. No.: WO2018/219792
PCT Pub. Date: Dec. 6, 2018

(65) Prior Publication Data
US 2021/0164525 A1    Jun. 3, 2021

(30) Foreign Application Priority Data
May 31, 2017   (FR) .................... 17 54841

(51) Int. Cl.
*F16D 13/52* (2006.01)
*F16D 21/06* (2006.01)
*F16D 13/58* (2006.01)

(52) U.S. Cl.
CPC ............ *F16D 21/06* (2013.01); *F16D 13/52* (2013.01); *F16D 13/58* (2013.01); *F16D 2021/0692* (2013.01)

(58) Field of Classification Search
CPC .......... F16D 21/06; F16D 13/52; F16D 13/58; F16D 2021/0692; F16D 13/70;
(Continued)

(56) References Cited

U.S. PATENT DOCUMENTS 3,384,214 A * 5/1968 Wilson .................... F16D 21/06
192/48.613
4,144,955 A * 3/1979 Garnier ............... F16D 25/0638
192/52.3
(Continued)

FOREIGN PATENT DOCUMENTS

DE   10 2013 219 390 A1   4/2014
FR   2 814 516 A1   3/2002
(Continued)

OTHER PUBLICATIONS

International Search Report dated Sep. 18, 2018 in PCT/EP2018/063731 filed on May 24, 2018, 2 pages.
International Search Report and Written Opinion dated Sep. 18, 2018 in PCT/EP2018/063731 (reference previously filed, now submitted with English translation of Written Opinion only), 16 pages.

*Primary Examiner* — David J Hlavka
(74) *Attorney, Agent, or Firm* — Oblon, McClelland, Maier & Neustadt, L.L.P.

(57) ABSTRACT

A clutch mechanism is configured to be driven in rotation about an axis and includes two assemblies. Each assembly includes: an outer disk carrier externally delimiting a cavity; a clutch including a stack of coupling disks and friction disks, the stack being housed in the cavity and configured to be driven in rotation about the axis; and a reaction member of the outer disk carrier configured to enable compression of the coupling disks against the friction disks in a clutch engaged position of the corresponding clutch. The clutch mechanism includes at least one device for assembling the two assemblies to one another.

20 Claims, 9 Drawing Sheets

(58) Field of Classification Search
CPC ............. F16D 2021/0607; F16D 25/10; F16D 2021/0661; F16D 25/082; F16D 48/066; F16D 2500/10418; F16D 2500/106; F16D 2500/3065; F16D 2500/3024; F16D 2500/70408; F16D 48/06; F16D 2500/1026; F16D 48/08; F16D 2500/1066; F16D 2500/3124; F16D 2500/3166; F16D 2500/50239; F16D 2500/50808; F16D 2500/7041; B60W 30/192; B60W 10/02; B60W 10/06; B60W 20/00; B60W 2554/00; B60W 2710/021; B60W 2710/06; B60W 2710/027; B60W 10/08; B60W 20/40; B60W 40/00; B60W 2710/02; B60W 2540/10; B60K 6/387; B60K 2006/268; B60K 2006/4825

See application file for complete search history.

(56) References Cited

U.S. PATENT DOCUMENTS

| | | | |
|---|---|---|---|
| 2009/0188765 A1* | 7/2009 | Mizuno | F16D 25/10 192/48.1 |
| 2013/0153356 A1* | 6/2013 | Fleischmann | F16H 57/0037 192/48.9 |
| 2018/0231066 A1* | 8/2018 | Lorenz | F16D 25/0638 |
| 2018/0238401 A1* | 8/2018 | Lorenz | F16D 13/52 |
| 2020/0182306 A1* | 6/2020 | Fujii | F16D 13/648 |

FOREIGN PATENT DOCUMENTS

| | | |
|---|---|---|
| WO | WO 2015/124154 A2 | 8/2015 |
| WO | WO 2017/076752 A1 | 5/2017 |

* cited by examiner

CLUTCH MECHANISM COMPRISING TWO ASSEMBLIES CONNECTED BY AN ASSEMBLING DEVICE

BACKGROUND OF THE INVENTION

Field of the Invention

The field of the present invention is that of motor vehicle transmissions. The invention relates more specifically to the field of motor vehicle double clutch mechanisms.

Description of the Related Art

Such double clutch mechanisms, generally of multidisk type, are known from the prior art. Such mechanisms are intended to be mounted on a gearbox of a motor vehicle in order to be coupled in rotation about an axis. This type of double clutch mechanism routinely comprising first and second clutches respectively associated with first and second shafts. The first and second clutches of these double clutch mechanisms may be configured to be disposed in an axial configuration, that is to say that the clutches and in particular the disks of the first and second clutches are disposed relative to one another about the axis and in a plane of symmetry perpendicular to the axis.

The document FR 2 814 516 describes such a double clutch mechanism of the wet type, that is to say fed under pressure with a hydraulic fluid such as oil, enabling lubrication and cooling of the double clutch mechanism when the respective disks of the clutches are coupled or uncoupled in a respectively clutch engaged or clutch disengaged position.

In particular, the above document describes such a double clutch mechanism configured to be driven in rotation about an axis and contained within a casing formed by assembling, by welding, two clutch covers and two walls together delimiting two clutch chambers disposed symmetrically with respect to one another. These two chambers each comprise a respective clutch. In this way the clutches of this double clutch mechanism and more particularly their respective disks are disposed in an axial configuration as described above. The respective disks of the clutches are disposed between respective pressure plates of each of the clutches and a median annular element corresponding to a reaction member is disposed between the two clutches in order to be common to them. These chambers are moreover configured to be fed with oil under pressure.

When a chamber of a clutch is fed with oil under pressure the disks of the corresponding clutch are held compressed against the pressure plate of the corresponding clutch and the reaction plate common to the two clutches. When a chamber of the clutch is not fed with oil under pressure the disks of the corresponding clutch are no longer held compressed between the pressure plate of the corresponding clutch and the reaction member common to the two clutches.

The above solution has numerous disadvantages. More particularly, a first disadvantage concerns the reaction member common to the two clutches. In this configuration the disks of each of the clutches exert a pressure force on the reaction member situated in an intermediate position between the two clutches. The reaction member can then be moved axially toward the pressure plate of the clutch concerned. The effect of this movement is to offset the clutch travel of the other, non-actuated clutch. It will therefore be clear that the effect with this configuration is to generate interdependencies and interactions between the clutches when they are actuated.

A second disadvantage of this solution concerns the steps of assembling this kind of double clutch mechanism. In fact, in a first assembly step for assembling this mechanism it is necessary to position and to hold the reaction member between the two clutch chambers in a position ensuring its function of reaction fore clutch disks of each of the clutches. In a second assembly step each of the clutch chambers is fastened by a welding process between the edge of a contour of the clutch chambers in contact with the reaction member, this kind of welding process being carried out over the whole of said contour. These assembly steps can then make such assembly difficult or even complex.

A third disadvantage concerns this kind of method of assembly by welding. In fact, an effect of this kind of welding process is to stress the parts by localized deformation thereof. These localized deformations can have the consequence of positioning the reaction member in an axial position relative to each of the clutch chambers that is not what is required. Such a position can then impact the travel of each of the clutches.

BRIEF SUMMARY OF THE INVENTION

An object of the present invention is to alleviate at least one of the aforementioned disadvantages and to propose a clutch mechanism enabling simplified assembly whilst enabling actuation of one clutch without disturbing the other clutch.

To this end, the invention consists in a clutch mechanism configured to be driven in rotation about an axis and comprising two assemblies, each assembly comprising at least:

an outer disk carrier externally delimiting a cavity, a clutch comprising a stack of coupling disks and friction disks, the stack being housed in the cavity and configured to be driven in rotation about the axis, a reaction member of the outer disk carrier configured to enable compression of the coupling disks against the friction disks in a clutch engaged position of the clutch, the clutch mechanism comprising at least one device for assembling the two assemblies to one another.

Thanks to these features it is possible to produce a clutch mechanism in two parts. Moreover, it is possible to avoid generating interdependencies and interactions between the clutches when they are actuated.

The clutch mechanism conforming to the invention may advantageously incorporate at least one of the following improvements, the technical features forming those improvements being taken separately or in combination:

the assembly device assembles the two assemblies to one another by means the outer disk carrier of each assembly;

the reaction members of each assembly are separate;

the reaction members are disposed axially between the clutches of the two assemblies;

the reaction member is mounted on the outer disk carrier of the associated assembly;

the reaction member of each assembly is separate from the outer disk carrier of the associated assembly;

the outer disk carriers of each assembly may have identical axial dimensions;

the outer disk carriers of each assembly may be of identical shape;

each of the outer disk-carriers of the assemblies comprises at least one first extension extending radially outwards beyond a peripheral edge of the corresponding outer disk carrier, at least the first extension of one outer disk carrier facing at least the first extension of the other outer disk carrier, the assembly device comprising at least the corresponding first extension of each outer disk carrier;

at least the first extension of the outer disk carriers is positioned at one axial end of the peripheral edge of the corresponding outer disk carrier;

at least the first extension of the outer disk carriers is positioned at the peripheral edge at a distance from an axial end of the corresponding outer disk carrier;

at least the first extension of the outer disk carriers is positioned beyond the peripheral edge at a distance from an axial end of the corresponding disk carrier;

at least one of the outer disk carriers comprises a plurality of first extensions distributed circumferentially around the peripheral edge of the corresponding outer disk carrier;

each of the outer disk carriers advantageously comprises a plurality of first extensions distributed circumferentially around the peripheral edge of the corresponding outer disk carrier;

at least one of the first extensions extends in a plane perpendicular to the axis over an angle less than 45°;

at least the first extension of at least one of the outer disk carriers forms a circular contour that extends around the peripheral edge of the corresponding outer disk carrier;

at least the first extension advantageously coincides with the peripheral edge;

at least the first extension is mounted on the peripheral edge of the outer disk carrier of at least one assembly of the clutch mechanism;

at least the first extension is in one piece with the peripheral edge of the outer disk carrier of at least one assembly of the clutch mechanism;

the assembly device comprises at least one rivet or one assembly screw configured to pass through an assembly hole formed in at least the first extension of at least one outer disk carrier;

the assembly device advantageously comprises at least one rivet or one assembly screw configured to pass through an assembly hole formed in at least the first extension of an outer disk carrier and through an assembly hole formed in at least the first extension of the other outer disk carrier;

the assembly advantageously comprises a plurality of rivets and/or assembly screws each configured to pass through an assembly hole formed in a first extension of an outer disk carrier and through an assembly hole formed in at least the first extension of the other outer disk carrier;

at least the first extension of a disk carrier advantageously bears axially against at least the first extension of the other outer disk carrier;

the reaction member of at least one assembly is advantageously fastened to its corresponding outer disk carrier, for example by welding;

the reaction member of at least one assembly is advantageously housed entirely in said cavity;

the reaction member of at least one assembly is advantageously housed entirely in said cavity at a distance from the peripheral edge of the outer disk carrier of the corresponding assembly;

the reaction member of at least one assembly comprises:
  a first part extending radially mainly outside the cavity, that is to say beyond the peripheral edge of the corresponding outer disk carrier, and
  a second part situated inside the cavity, that is to say inside the peripheral edge of the corresponding outer disk carrier;

the first part of the reaction member advantageously extends radially relative to the axis;

the second part of the reaction member advantageously extends radially relative to the axis;

the second part of the reaction member of at least one assembly comprises an inner radial edge that extends axially toward the clutch of said corresponding assembly;

the second part of the reaction member of at least one assembly advantageously comprises an inner radial edge that extends axially and radially toward the clutch of said corresponding assembly;

the reaction member of at least one assembly formed by the first part and the second part has an S-shape section;

the reaction member of at least one assembly advantageously has an I-shape section;

the reaction member of at least one assembly advantageously has an L-shape section;

the reaction member of at least one assembly advantageously has a Y-shape section;

the first part of at least one reaction member comprises an outer radial edge from which extend radially outwards first angular sectors distributed circumferentially around the axis, each first angular sector of the corresponding reaction member cooperating with at least the first extension of the corresponding outer disk carrier;

the first angular sectors advantageously extend radially outwards relative to the axis;

the first part of at least one reaction member forms a circular contour that extends circumferentially around the axis;

the first part of the reaction member of at least one assembly bears axially against the first part of the reaction member of the other assembly;

there is advantageously a non-zero axial clearance between the second parts of the reaction members of the assemblies;

the first part of the reaction member of each assembly advantageously bears axially against the peripheral edge of its corresponding disk carrier;

at least one first angular sector of the first part of the reaction member of at least one assembly is adapted to cooperate with at least the first extension of the corresponding outer disk carrier in order to assemble the reaction member to its corresponding outer disk carrier;

at least one first angular sector of the first part of the reaction member of at least one assembly is advantageously adapted to cooperate with at least the first extension of the corresponding outer disk carrier in order to assemble the reaction member to its corresponding outer disk carrier;

at least the first angular sector of the first part of the reaction member of at least one assembly advantageously bears axially against at least the first extension of the outer disk carrier of the corresponding assembly;

the assembly device comprises at least a rivet or one assembly screw configured to pass through an assembly orifice formed in at least one first angular sector of the first part of the reaction member of one assembly and through an assembly hole formed in a first extension of the outer disk carrier of the same assembly;

the first part of the reaction member of one assembly is adapted to cooperate with the first part of the reaction member of the other assembly in order to assemble the assemblies to one another, the assembly device comprising the first part of the reaction member of each assembly;

the first part of the reaction member of each assembly comprises second angular sectors distributed circumferentially around the axis and that extend radially outwards from the outer radial edge, each second angular sector of the reaction member of one assembly cooperating with a second angular sector of the reaction member of the other assembly;

at least one second angular sector of the first part of the reaction member of one assembly is advantageously adapted to cooperate with at least one second angular sector of the first part of the reaction member of the other assembly in order to assemble the assemblies to one another, the assembly device comprising at least the corresponding second angular sector of the first part of the reaction member of each assembly;

the second angular sectors of the first part of the reaction member of one assembly advantageously bear axially against the second angular sectors of the first part of the reaction member of the other assembly;

the assembly device comprises at least one rivet or one assembly screw configured to pass through an assembly orifice formed in at least one second angular sector of the first part of the reaction member of one assembly and through an assembly orifice formed in at least one second angular sector of the first part of the reaction member of the other assembly;

the first part of the reaction member of at least one assembly is adapted to cooperate both with the first part of the reaction member of the other assembly and with at least the first extension of the outer disk carrier of each assembly;

at least one first angular sector of the first part of the reaction member of at least one assembly is advantageously adapted to cooperate both with at least one first angular sector of the first part of the reaction member of the other assembly and with at least the first extension of the outer disk carrier of each assembly in order to assemble the assemblies to one another, the assembly device comprising at least the corresponding first angular sector of the first part of the reaction member of each assembly and at least the corresponding first extension of the outer disk carrier of each assembly;

the assembly device comprises at least one rivet or one assembly screw configured to pass through an assembly orifice formed in at least one first angular sector of the first part of the reaction member of one assembly and through an assembly orifice formed in at least one first angular sector of the first part of the reaction member of the other assembly;

the assembly device comprises at least one rivet or one assembly screw configured to pass through an assembly orifice formed in at least one first angular sector of the first part of the reaction member of an assembly and through an assembly hole formed in at least the first extension of the outer disk carrier of the corresponding assembly;

the assembly device comprises at least one rivet or one assembly screw configured to pass through an assembly orifice formed in a first angular sector of the first part of the reaction member of each assembly and through an assembly hole formed in at least the first extension of the outer disk carrier of each assembly;

the assembly device advantageously comprises a plurality of rivets;

the first part of the reaction member of at least one assembly advantageously comprises an assembly zone for assembling the reaction member with the corresponding outer disk carrier;

the outer disk carrier of at least one assembly comprises at least the second extension extending beyond the peripheral edge of the outer disk carrier of the corresponding assembly, at least the second extension comprises a first portion and a second portion for assembling the assemblies to one another, the assembly device comprising at least the corresponding second extension;

the first portion advantageously extends axially in the opposite direction beyond the peripheral edge of the corresponding outer disk carrier and the second portion advantageously extends radially outwards beyond the peripheral edge of the corresponding outer disk carrier;

the second portion is advantageously successive to the first portion;

the first portion and the second portion are advantageously delimited by a common junction bend;

the first portion and the second portion advantageously together form an L-shape section;

the peripheral edge of the corresponding outer disk carrier and the first portion are advantageously configured to receive in corresponding relationship the outer radial edge of the first part of the reaction member;

each of the outer disk-carriers comprises at least one second extension, at least the second extension of one outer disk carrier being adapted to cooperate with at least the second extension of the other outer disk carrier, the assembly device comprising the corresponding second extensions;

the first part of the reaction member of at least one assembly comprises second angular sectors distributed circumferentially around the axis and that extend radially outwards from the outer radial edge and at least one second extension of an outer disk carrier of one assembly is adapted to cooperate with at least one second angular sector of the first part of the reaction member of the other assembly, the assembly device comprising at least the corresponding second extension and at least the corresponding second angular sector;

the outer radial edge of the first part of the corresponding reaction member bears radially against the first portion of at least the second extension;

the assembly device comprises at least one rivet or one assembly screw configured to pass through an assembly opening formed in the second portion of at least one second extension of an outer disk carrier of one assembly and through an assembly opening formed in the second portion of at least one second extension of an outer disk carrier of the other assembly;

the assembly device comprises at least one rivet or one assembly screw configured to pass through an assembly opening formed in the second portion of at least one second extension of an outer disk carrier of one assembly and through an assembly orifice formed in at least one second angular sector of the first part of the reaction member of the other assembly;

the clutch mechanism is a clutch mechanism of the wet double clutch type;

the clutches are wet and disposed axially alongside one another;

The invention also relates to a motor vehicle transmission characterized in that it comprises a clutch mechanism as described above.

The transmission advantageously comprises at least a gearbox and a clutch cover that delimits a volume inside which extends at least in part the clutch mechanism.

The invention also relates to a method of assembling a clutch mechanism according to the invention onto a vehicle transmission, the method comprising the following steps:

a positioning step consisting in disposing the assemblies relative to one another so that at least the first extension of one of the outer disk carriers faces at least the corresponding first extension of the other outer disk carrier;

an assembly step consisting in fixing the assemblies to one another by at least the first extension of each outer disk carrier with the aid of the corresponding assembly device.

According to a variant of the invention, before the positioning step the reaction member of each assembly is mounted on the outer disk carrier of the corresponding assembly by means of the assembly device.

In accordance with a variant of the invention, the assembly method comprises a step of centering one assembly relative to the other assembly.

BRIEF DESCRIPTION OF THE SEVERAL VIEWS OF THE DRAWINGS

Other features, details and advantages of the invention will emerge more clearly on reading the description given hereinafter by way of illustration and with reference to the drawings, in which.

DETAILED DESCRIPTION OF THE INVENTION

In the remainder of the description and in the claims there will be used in a non-limiting manner and in order to facilitate an understanding thereof the following terms:

"front" (AV) or "rear" (AR) in accordance with the direction relative to an axial orientation determined by the main axis O of rotation of the transmission system, "rear" designating the part situated on the right in the figures, on the transmission side, and "front" designating the left-hand part of the figures, on the engine side;

"inner/internal" or "outer/external" relative to the axis O and in accordance with a radial orientation orthogonal to said axial orientation, "inner" designating a part near the axis O and "outer" designating a part distant from the axis O; and "corresponding" as attaching the object of an assembly or the assembly to which this term is attached to another object of the same assembly.

The clutch mechanism 10 shown in FIG. 1 will be described first. It will be noted that the clutch mechanisms 10 of each of the embodiments are identical and may be described in a similar manner to the embodiment from FIG. 1.

Figure 1:
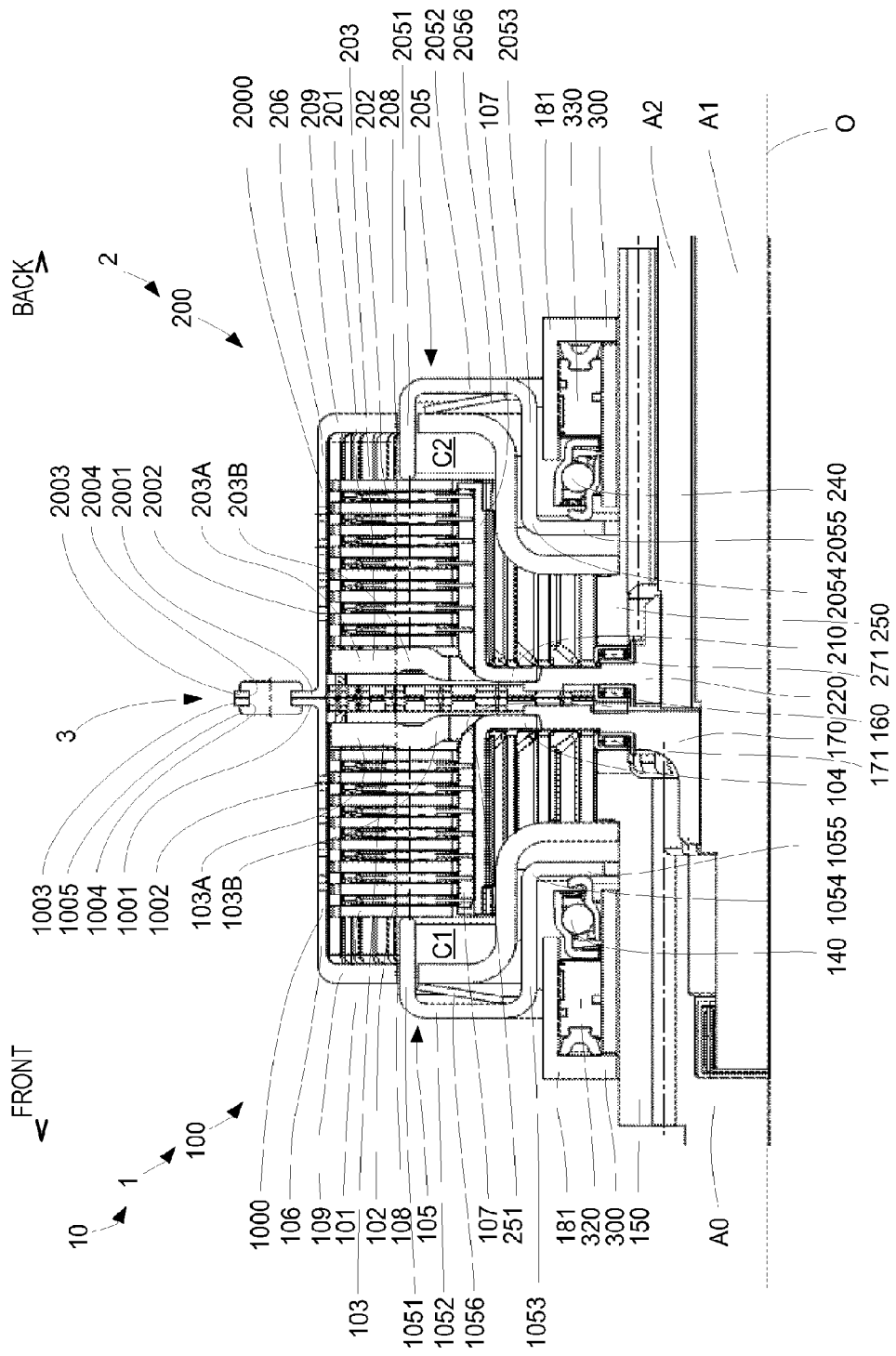
FIG. 1 shows a sectional view of a first embodiment in which the assemblies are assembled to their corresponding outer disk-carrier by first extensions, the reaction members being housed in the cavities.

Thus, as shown in FIG. 1, the embodiment of the clutch mechanism 10 is formed of two assemblies 1, 2. Each assembly 1, 2 forming a part of the clutch mechanism 10, the assemblies 1, 2 forming the clutch mechanism 10.

The clutch mechanism 10 is driven in rotation about an axis O and intended to equip a motor vehicle transmission. To this end, the clutch mechanism 10 is mounted on a clutch housing of the motor vehicle transmission.

The clutch mechanism 10 is preferably of the wet double clutch type, and more preferably in a so-called axial position, a first clutch 100 forming an assembly 1 situated at the front (AV) relative to a second clutch 200 forming another assembly 2. The double clutch mechanism 10 is integrated into a transmission system comprising a transmission, not shown in FIG. 1, the transmission being rotationally coupled to the double clutch mechanism 10.

The double clutch mechanism 10 is generally adapted to be able to couple an input shaft A0 in rotation to a first transmission shaft A1 or alternatively to a second transmission shaft A2 respectively via the first clutch 100 or the second clutch 200.

In the context of the invention, the input shaft A0 is driven in rotation by at least one crankshaft of an engine, for example an internal combustion engine not shown in FIG. 1, and the first and second transmission shafts A1, A2 are intended to be coupled in rotation to the transmission, such as for example a gearbox of the type equipping motor vehicles.

The first transmission shaft A1 and the second transmission shaft A2 are preferably coaxial. The second transmission shaft A2 more particularly takes the form of a hollow cylinder inside which the first transmission shaft A1 may be inserted.

As shown in FIG. 1, the first clutch 100 and the second clutch 200 are advantageously of the multidisk type. Each multidisk clutch comprises on the one hand a plurality of coupling disks 101, 201 constrained to rotate with the input shaft A0 and on the other hand a plurality of friction disks 102, 202 constrained to rotate with at least one of the transmission shafts A1, A2. The plurality of coupling disks 101, 201 of each clutch 100, 200 and the plurality of friction disks 102, 202 of each clutch 100, 200 together form a respective stack.

The first transmission shaft A1 is coupled in rotation to the input shaft A0 and driven by it in rotation when the first clutch 100 is configured in a so-called clutch engaged position in which the plurality of coupling disks 101 is coupled in rotation to the plurality of friction disks 102. Alternatively, the first transmission shaft A1 is decoupled in rotation from the input shaft A0 when the first clutch 100 is configured in a so-called clutch disengaged position in which the plurality of coupling disks 101 is decoupled in rotation from the plurality of friction disks 102.

In an analogous manner, the second transmission shaft A2 is coupled in rotation to the input shaft A0 and driven by it in rotation when the second clutch 200 is configured in a clutch engaged position in which the plurality of coupling disks 201 is coupled in rotation to the plurality of friction disks 202. Alternatively, the second transmission shaft A2 is decoupled in rotation from the input shaft A0 when the second clutch 200 is configured in a so-called clutch disengaged position in which the plurality of coupling disks 201 is decoupled in rotation from the plurality of friction disks 202.

In the double clutch mechanism 10 shown in FIG. 1 the first clutch 100 is adapted to engage the odd gear ratios of the transmission and the second clutch 200 is adapted to engage the even gear ratios and the reverse gear of the transmission. Alternatively, the gear ratios handled by said first clutch 100 and said second clutch 200 may be interchanged.

The first clutch 100 and the second clutch 200 are adapted to transmit alternately a so-called input power—a torque and a rotation speed—of the input shaft to one of the two transmission shafts A1, A2 as a function of the respective configuration of each clutch 100 and 200 and via an input flange 109.

The clutches 100 and 200 are adapted not to be simultaneously in the same clutch engaged configuration. On the other hand, the first and second clutches 100, 200 may be simultaneously configured in their clutch disengaged position.

The double clutch mechanism 10 will now be described in more detail.

As represented in FIG. 1, the double clutch mechanism 10 comprises an input element that is coupled in rotation on the one hand to the input shaft A0 and on the other hand to the input flange 109 in order to transmit the power—the torque and the rotation speed—generated by the engine to one of the clutches 100, 200 of the double clutch mechanism 10. The input element of the double clutch mechanism 10 preferably comprises an input hub 150 preferably rotating about the axis O. In its lower extension, the input hub 150 is connected in rotation and/or axially to the input shaft A0, where applicable via a damping device that is not shown such as a dual mass flywheel for example.

In its outer extension the input hub 150 is coupled to the input flange 109 and more particularly at the level of a lower end situated to the rear of said input flange 109. The input flange 109 and the input hub 150 are preferably fastened together, for example by welding and/or riveting them together.

At its upper end, the input flange 109 of the first clutch 100 is connected in rotation to the first clutch 100 via an outer disk carrier 106 of the first clutch 100, the outer disk carrier 106 being connected to the input flange 109; the input flange 109 and the outer disk carrier 106 are preferably in one piece. The outer disk carrier 106 of the first clutch 100 delimits externally a cavity C1 in which is housed the stack of coupling disks 101 and friction disks 102 of the first clutch 100.

The first and second clutches 100 and 200 are controlled by an actuator system 300 that is adapted to be able to configure them in any configuration between the clutch engaged configuration and the clutch disengaged configuration.

The actuator system 300 comprises:
- a first actuator 320 adapted to configure the first clutch 100 in a configuration between the clutch engaged position and the clutch disengaged position inclusive;
- a second actuator 330 adapted to configure the second clutch 200 in a configuration between the clutch engaged configuration and the clutch disengaged configuration inclusive;
- a casing 181 of the actuator system 300 in which the first and second actuators 320, 330 are at least in part housed.

The first and second actuators 320 and 330 are preferably of the hydraulic cylinder type. Each of the first and second actuators 320, 330 may comprise an annular piston, each annular piston being coaxial with the axis O and moving axially to configure the corresponding clutch. In this case, the actuator system 300 also comprises a hydraulic fluid feed channel for each actuator 320, 330. The hydraulic fluid is preferably a fluid, for example oil, under pressure.

The first actuator 320 is connected to the first clutch 100 on the one hand via a first decoupling bearing 140 and on the other hand by a first force transition member 105. The first decoupling bearing 140 is adapted to transmit axial forces generated by the first actuator 320 to the first force transmission member 105.

The first force transmission member 105 is adapted to transmit an axial force to the first clutch 100 via its upper extension, said upper extension extending axially toward the front and through an opening 108 formed in the input flange 109 so as to be able to press the plurality of coupling disks 101 on the one hand against the plurality of friction disks 102 and on the other hand against a reaction member 103 of the first clutch 100 as described in more detail hereinafter in the various embodiments.

The first force transmission member 105 takes the form of a corrugated sheet curved axially toward the front at its radial outer edge. The first force transmission member 105 more particularly collaborates with the first clutch 100 via a plurality of axial extension bearing surfaces 1051 forming upper fingers 1051 that enable the coupling disks 101, 102 of the first clutch 100 to be pushed toward the front by axial movement toward the front of the first actuator 320.

By way of nonlimiting example, the first force transmission member 105 may be produced by pressing.

The first force transmission member 105 comprises an upper radial extension bearing surface 1052 situated in front of the upper fingers 1051. The upper radial extension bearing surface 1052 extends radially from the first clutch 100.

An intermediate axial extension bearing surface 1053 extends the upper radial extension bearing surface 1052 toward the rear of the double clutch mechanism 10.

Finally, the first force transmission member 105 comprises an inner radial extension part 1055 connected to the intermediate axial extension bearing surface 1053 via a curved zone 1054. The front face of the inner radial extension part 1055 is in contact with a rear face of the first decoupling bearing 140 connected to the first actuator 320.

The reaction member 103 is fastened to the outer disk carrier 106 of the first clutch 100. In particular, the reaction member 103 is prevented from moving axially toward the rear by an axial stop abutment. The reaction member 103 is preferably fixed and fastened to the outer disk carrier 106 of the first clutch by any assembly means, such as for example by riveting or by welding.

The reaction member 103 is mounted on the outer disk carrier 106 of the first clutch 100.

The reaction member 103 is configured to enable friction coupling of the coupling disks and the friction disks 101, 102 when the first actuator 320 exerts an axial force toward the rear to configure the first clutch 100 in its clutch engaged position. A contrario, when the first force transmission member 105 is pushed toward the front by an elastic return washer 1056 the coupling disks 101 are separated from the friction disks 102, thus enabling decoupling thereof and configuration of the first clutch 100 in its clutch disengaged configuration. It will be clear that the elastic return washer 1056 bears against the first force transmission member 105 and against the input flange 109 and is loaded axially by the input hub 150 and the axial bearing 171.

The reaction member 103 has in particular exterior splines that cooperate with corresponding interior splines of the outer disk carrier 106.

The first clutch 100 is intended to be coupled in rotation to the first transmission shaft A1 via a first output disk carrier 104 forming an output element of said first clutch 100.

The first output disk carrier 104 is more particularly coupled in rotation on the one hand to the friction disks 102 at its upper end and on the other hand to a first output hub 170 at its lower end.

The first output disk carrier 104 includes at its outer radial periphery an axial elongation 107 that is provided with teeth intended to cooperate with complementary teeth on each friction disk 102, and more particularly at the inner radial periphery of each friction disk 102 of the first clutch 100. The first output disk carrier 104 is therefore coupled in rotation to the friction disks 102 of the first clutch 100 by meshing with them.

At its lower radial end the first output disk carrier 104 is connected to the first output hub 170; they are preferably fixed together by welding or riveting them together.

The first output hub 170 includes radially inside it axial splines adapted to cooperate with complementary splines situated on the first transmission shaft A1 so as to provide coupling in rotation.

The axial bearing 171 is disposed between the first output hub 170 and the input hub 150 in order to withstand the axial forces of the input hub 150 and/or of the input flange 109 despite the different rotation speeds at which the input shaft and the first transmission shaft A1 may be turning.

In analogous manner the second clutch 200 of the double clutch mechanism 10 is of similar design to that of the first clutch 100.

The second actuator 330 is connected to the second clutch 200 via on the one hand a second decoupling bearing 240 and on the other hand a second force transmission member 205. The second decoupling bearing 240 is adapted to transmit axial forces generated by the second actuator 330 to the second force transmission member 205.

At its upper end an input flange 209 of the second clutch 200 is connected in rotation to the second clutch 200 via an outer disk carrier 206 of the second clutch 200, the outer disk carrier 206 of the second clutch 200 being connected to the input flange 209; the input flange 209 and the outer disk carrier 206 are preferably in one piece. The outer disk carrier 206 of the second clutch 200 delimits externally a cavity C2 in which is housed the stack of coupling disks 201 and friction disks 202 of the second clutch 200.

The second force transmission member 205 is adapted to transmit an axial force to the second clutch 200 via its upper elongation, said upper elongation extending axially toward the front and through an opening 208 formed in the outer disk carrier 206 so as to be able to press the coupling disks 201 against the friction disks 202 on the one hand and against a reaction member 203 of the second clutch 200 on the other hand, as described in detail hereinafter in the various embodiments.

The second force transmission member 205 takes the form of a corrugated sheet curved axially toward the front at its outer radial edge. The second force transmission member 205 more particularly collaborates with the second clutch 200 via a plurality of axial extension bearing surfaces 2051 forming inner fingers 2051 that enable the coupling and friction disks 201, 202 of the second clutch 200 to the be pushed toward the front by axial movement toward the front of the second actuator 330.

By way of nonlimiting example the second force transmission member 205 may be produced by pressing.

The second force transmission member 205 comprises an upper radial extension bearing surface 2052 situated to the rear of the upper fingers 2051. The upper radial extension bearing surface 2052 extends radially from the second clutch 200.

An intermediate axial extension bearing surface 2053 extends the upper radial extension bearing surface 2052 under the second clutch 200 and toward the front of the double clutch mechanism 10. The intermediate axial extension bearing surface 2053 is situated radially inside the second clutch 200.

Finally, the second force transmission member 205 comprises an inner radial extension part 2055 connected to the intermediate axial extension bearing surface 2053 via a curved zone 2054. The rear face of the inner radial extension part 2055 is in contact with a front face of the second decoupling bearing 240 connected to the second actuator 330.

The reaction member 203 of the second clutch 200 is fastened to the outer disk carrier 206 of the second clutch 200. The reaction member 203 of the second clutch 200 is preferably fixed and fastened to the outer disk carrier 206 of the second clutch 200 by any means, such as for example by welding or by riveting. The reaction member 203 of the second clutch 200 is configured to enable friction coupling of the coupling disks 201 and friction disks 202 when the second actuator 330 exerts an axial force toward the front to configure the second clutch 200 in its clutch engaged position. A contrario, when the second force transmission member 205 is pushed toward the rear by a return elastic washer 2056 the coupling disks 201 are then separated from the friction disks 202, then enabling uncoupling and therefore configuration of the second clutch 200 in its clutch disengaged configuration. It will be clear that the return elastic washer 2056 bears against the second force transmission member 205 and against the input flange 209 and is axially loaded by a shim 250 and by an axial bearing 271.

By way of nonlimiting example the reaction member 203 of the second clutch 200 may take the form of a ring with teeth on the outside perimeter and a central bearing groove that extends axially toward the rear.

The reaction member 203 is mounted on the outer disk carrier 206 of the second clutch 200.

The second clutch 200 is intended to be coupled in rotation to the second transmission shaft A2 via a second output disk carrier 210 forming an output element of said second clutch 200. The second output disk carrier 210 is more particularly coupled in rotation on the one hand to the friction disks 202 at its upper end and on the other hand to a second output hub 220 at its lower end.

The second output disk carrier 210 includes on its outside radial periphery an axial elongation 207 that includes teeth intended to cooperate with complementary teeth on each friction disk 202 and more particularly on the inner radial periphery of each friction disk 202 on the second clutch 200. The second output disk carrier 210 is therefore coupled in rotation to the friction disks 202 of the second clutch 200 by meshing with them.

At its lower radial end the second output disk carrier 210 is connected to the second output hub 220; they are preferably fixed together by welding or riveting them together. Moreover, an axial bearing 160 is inserted between the first output hub 170 and the second output hub 220 in order to be able to transmit an axial force between the two output disk carriers 104, 210 that are able to turn at different speeds when the first and second clutches 100, 200 are configured in different configurations. An axial clearance is provided between the axial bearing 160 and the first and second output hubs.

The second output hub 220 includes radially internally axial splines adapted to cooperate with complementary splines situated on the second transmission shaft A2 in such a manner as to produce the coupling in rotation.

The axial bearing 271 is disposed between the second output hub 220 and the shim 250 connected to the input flange 209 of the second clutch 200 in order to withstand the axial forces of the shim 250 and/or of the input flange 209 despite the different rotation speeds at which the input shaft and the second transmission shaft A2 may respectively turn.

The first and second clutches 100, 200 respectively comprise the return elastic washers 1056, 2056. The return elastic washers 1056, 2056 are adapted to generate a return force oriented axially toward the front and toward the rear, respectively, in order automatically to push the first and second actuators 320, 330 toward the front and toward the rear, respectively. The return elastic washers 1056, 2056 more particularly urge the first and second force transmission members 105, 205 axially respectively toward the front and toward the rear in order to facilitate the movement apart of the coupling disks 101, 201 relative to the friction disks 102, 202 of the first and respectively the second clutch 100, 200 by pushing the first and the second actuators 320, 330 respectively toward the front and toward the rear.

The outer disk carriers 106, 206 of the assemblies 1, 2 and in particular the device 3 for assembling the two assemblies 1, 2 to one another will be described in the remainder of the description. As described hereinafter a number of embodiments are envisaged for assembling the assemblies 1, 2 to one another. The clutch mechanism 10 therefore comprises a number of embodiments of the assembly of the outer disk carriers 106, 206 of each assembly 1, 2 to one another and/or a number of embodiments of the assembly of the reaction members 103, 203 to one another and/or to the corresponding outer disk carriers 106, 206. It will be clear that a clutch mechanism 10 of this kind may comprise any combination of the embodiments of the assembly of the outer disk carriers 106, 206 of each assembly 1, 2 to one another and/or embodiments of the assembly of the reaction members 103, 203 to one another and/or to the corresponding outer disk carriers 106, 206. It will also be noted that a clutch mechanism 10 of this kind may be produced by an alternation of two complementary embodiments, for example an embodiment of the assembly of two assemblies 1, 2 via their outer disk carriers 106, 206 and another embodiment in which the reaction members 103, 203 are fixed to one another and/or to their corresponding outer disk carriers 106, 206.

Figure 2:
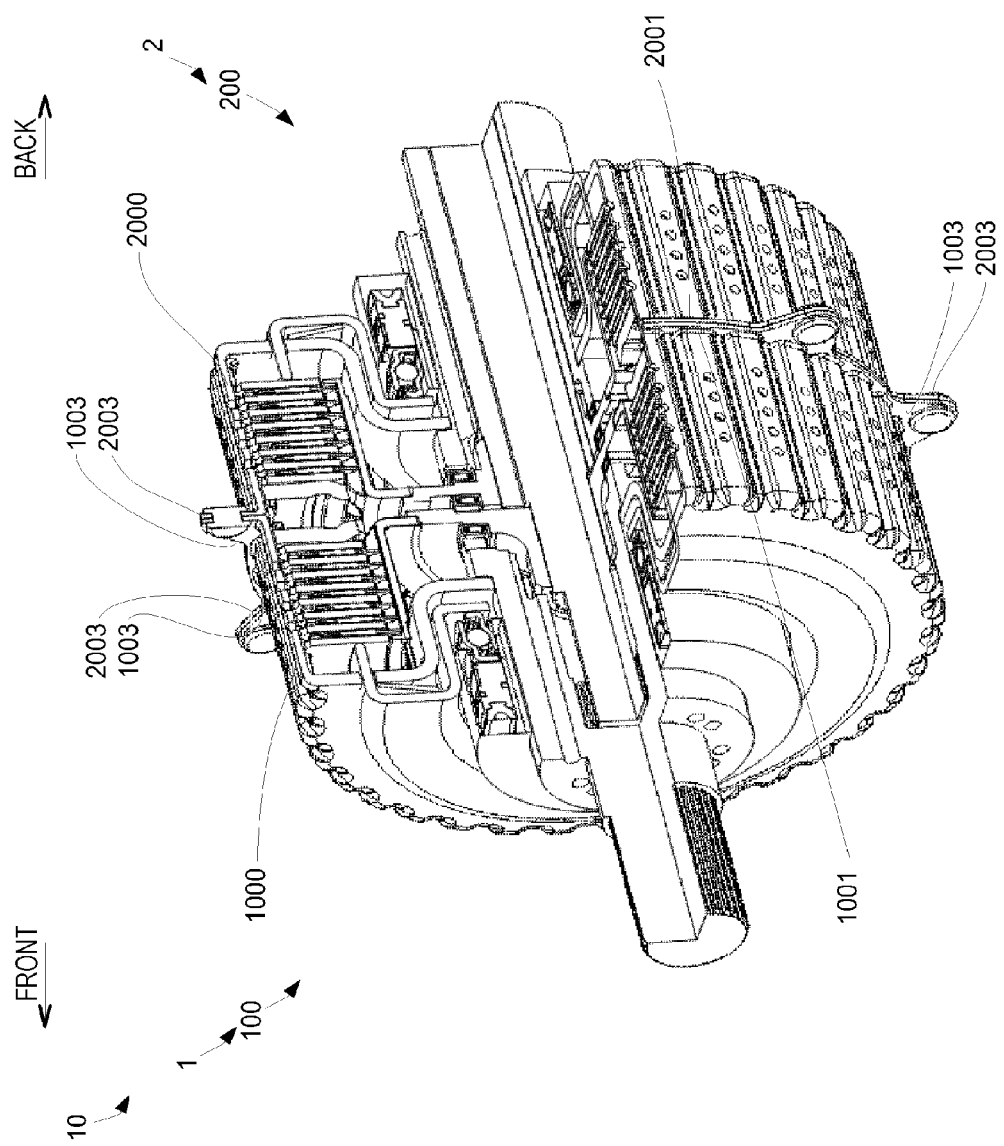
FIG. 2 shows a perspective view of the first embodiment from FIG. 1.

As is generally the case in each of the embodiments, the outer disk carrier 106 of the first clutch 100 of the assembly 1 corresponding thereto comprises a first axial elongation bearing surface 1000 oriented toward the rear in the direction of the second clutch 200 of the other assembly 2. The first axial elongation bearing surface 1000 delimits radially outwards the cavity C1 inside which the first clutch 100 is housed. The outer disk carrier 206 of the second clutch 200 of the assembly 2 comprises a second axial elongation bearing surface 2000 oriented toward the front in the direction of the first clutch 100 of the assembly 1. The second axial elongation bearing surface 2000 delimits radially outwards the cavity C2 inside which the second clutch 200 is housed. As shown here, the first axial elongation bearing surface 1000 and the second axial elongation bearing surface 2000 respectively comprise a peripheral edge 1001, 2001 situated at their respective axial ends. It will then be clear that each assembly 1, 2 comprises a peripheral edge 1001, 2001. The peripheral edge 1001 of the first axial elongation bearing surface 1000 and the peripheral edge 2001 of the second axial elongation bearing surface 2000 respectively extend radially outwards beyond the respective axial end of the first axial elongation bearing surface 1000 and the second axial elongation bearing surface 2000. It will be noted that the respective peripheral edge 1001, 2001 of the first axial elongation bearing surface 1000 and of the second axial elongation bearing surface 2000 are circles around the axis O, as shown in FIG. 1 or 2 for example. As shown in this first embodiment, the peripheral edges 1001, 2001 of the assemblies 1, 2 are in one piece. The peripheral edge 1001, 2001 of an assembly 1, 2 may preferably be machined via the surface facing the other peripheral edge 1001, 2001. The effect of this machining step is to ensure the tolerances between the two assemblies 1, 2 of the clutch mechanism 10. In this regard it will be clear that the outer disk carrier 106, 206 of each assembly 1, 2 has axial dimensions such as to ensure their positioning and their assembly relative to one another. It will in particular be specified that the outer disk carriers 106, 206 of the assemblies 1, 2 have dimensions such as to ensure the positioning of the axial bearing 160 inserted between the first output disk carrier 104 and the second output disk carrier 210. Evacuation holes 1002, 2002 formed radially on the first axial elongation bearing surface 1000 and the second axial elongation bearing surface 2000, respectively, enable evacuation of some of the hydraulic fluid contained in the cavities C1, C2 of the clutches 100, 200. It will also be noted that an axial adjustment shim 251 is inserted between the first output disk carrier 104 and the axial bearing 160.

It will also be noted that the outer disk carriers 106, 206 of the assemblies 1, 2 are identical, in particular the first axial elongation bearing surface 1000 and the second axial elongation bearing surface 2000 have identical axial dimensions. It will be clear that there are then identical numbers of stacks of coupling disks 101, 201 and of friction disks 102, 202 in the first and second clutches 100, 200. Thanks to this feature, it is possible to reduce production costs during the manufacture of clutch mechanisms 10 of this kind. In fact, the outer disk carrier 106, 206 of the assemblies 1, 2 may then be common to the first and second clutches 100, 200.

The invention is not limited to this configuration, however, and the outer disk carriers 106, 206 of the assemblies 1, 2 may be identical, and in particular the first axial elongation bearing surface 1000 and the second axial elongation bearing surface 2000 may have identical axial dimensions whereas the stacks of coupling disks 101, 201 and of friction disk 102, 202 of the first and second clutches 100, 200 may not be identical in number.

In a variant of the invention the outer disk carriers 106, 206 of the assemblies 1, 2 may not be identical, and in particular the first axial elongation bearing surface 1000 and the second axial elongation bearing surface 2000 may have different axial dimensions. Thanks to this configuration it is possible to produce clutch mechanisms 10 in which the stacks of coupling disks 101, 201 and of friction disk 102, 202 of the first and second clutches 100, 200 are different in number, as a function of the torques to be transmitted between the input shaft and the corresponding output shaft. It will be clear that in contrast to a clutch mechanism 10 in which the outer disk carriers 106, 206 are in one piece, it is possible to combine assemblies 1, 2 to produce a required clutch mechanism 10. For example, the first clutch 100 may comprise an even number of coupling disks 101 and friction disks 102 while the second clutch 200 may comprise an odd number of coupling disks 201 and friction disks 202. Thus one assembly 1, 2 may be combined with another assembly 1, 2 to arrive at the required clutch mechanism 10.

In accordance with a first embodiment shown in FIGS. 1 and 2, the reaction member 103, 203 of each assembly 1, 2 is housed in the respective cavity C1, C2 of the outer disk carrier 106, 206 of the corresponding assembly 1, 2. A first part 103A, 203A of each reaction member 103, 203 extending radially outwards more particularly bears against the stack of coupling disks 101, 201 and of friction disks 102, 202 of the corresponding clutch 100, 200. A second part 103B of the reaction member 103 of the first clutch 100 extends mainly axially toward the rear consecutively to the first part 103A of the reaction member 103 of the first clutch 100 while a second part 203B of the reaction member 203 of the second clutch 200 extends mainly axially toward the front consecutively to the first part 203A of the second clutch 200. It will therefore be clear that the second parts 103B, 203B extend toward one another. In accordance with this same configuration the reaction members 103, 203 are respectively fastened to their outer disk carrier 106, 206 by an outer radial edge of their first part 103A, 203A. In particular, the reaction member 103 of the first clutch 100 is prevented from moving axially toward the rear by an axial stop abutment and the reaction member 203 of the second clutch 200 is prevented from moving axially toward the front by another axial stop abutment. The reaction members 103, 203 are preferably fastened to their respective outer disk carrier 106, 206 by welding them thereto. It will be clear that the reaction members 103, 203 are of circular shape around the axis O and are annular at their center.

The reaction members 103, 203 are mounted on the outer disk carriers 106, 206 of the first and second clutches 100, 200.

In accordance with this first embodiment, the peripheral edges 1001, 2001 of the assemblies 1, 2 are disposed so as to face one another, and the peripheral edges 1001, 2001 of the assemblies 1, 2 are more particularly symmetrical with respect to one another. In this configuration an axial clearance is therefore formed between the reaction members 103, 203. The inner radial ends of each first part 103A, 203A of the reaction members each form a pressure zone bearing axially against their coupling disks 101, 201 and friction disks 102, 202 of the corresponding clutch 100, 200. However, the invention is not limited to this configuration and the peripheral edges 1001, 2001 of the assemblies 1, 2 may, in any of the embodiments, have different sections whilst nevertheless being disposed facing one another.

In the configuration of the first embodiment shown in FIG. 1 or 2 the peripheral edges 1001, 2001 are adapted to bear axially against one another when the two assemblies 1, 2 are assembled to form the clutch mechanism 10.

As shown in FIGS. 1 and 2 the outer disk carrier 106 of the first clutch 100 comprises first extensions 1003. In an identical manner the outer disk carrier 206 of the second clutch 200 comprises first extensions 2003. The first extensions 1003, 2003 of the outer disk carriers 106, 206 extend radially outwards beyond the respective peripheral edges 1001, 2001 of the corresponding outer disk carriers 106, 206. It will be clear that the first extensions 1003, 2003 of the outer disk carriers 106, 206 moreover extend from the respective peripheral edges 1001, 2001 of the corresponding outer disk carriers 106, 206. As shown here, the respective first extensions 1003, 2003 of each outer disk carrier 106, 206 are distributed circumferentially around the peripheral edge 1001, 2001 of the corresponding outer disk carrier 106, 206. It will be clear that the respective first extensions 1003, 2003 of each outer disk carrier 106, 206 are regularly circumferentially distributed around the axis O.

By way of example, each outer disk carrier 106, 206 may comprise eight first extensions 1003, 2003.

Alternatively, the first extensions 1003, 2003 of each first part 103A, 203A and their respective peripheral edge 1001, 2001 are in one piece. The first extensions 1003, 2003 of each first part 103A, 203A are preferably mounted on their respective peripheral edge 1001, 2001.

It will also be noted that the first extensions 1003 of the outer disk carrier 106 of the assembly 1 formed by the first clutch 100 are configured to face the first extensions 2003 of the outer disk carrier 206 of the assembly 2 formed by the second clutch 200. The first extensions 1003 of the outer disk carrier 106 of the assembly 1 formed by the first clutch 100 are more particularly configured to bear axially against the first extensions 2003 of the outer disk carrier 206 of the assembly 2 formed by the second clutch 200. The first extensions 1003, 2003 of the outer disk-carriers 106, 206 are moreover configured to form in part a device 3 for assembling the two assemblies 1, 2 to one another.

In accordance with this first embodiment of the invention, the assembly device 3 comprises each pair of first extensions 1003, 2003 constituted by a first extension 1003 of the outer disk carrier 106 of the assembly 1 formed by the first clutch 100 facing a first extension 2003 of the outer disk carrier 206 of the assembly 2 formed by the second clutch 200.

As shown in FIG. 1, each first extension 1003 of the outer disk carrier 106 of the assembly 1 formed by the first clutch 100 comprises assembly holes 1004 in corresponding relationship with assembly holes 2004 of the first extensions 2003 of the outer disk carrier 206 of the assembly 2 formed by the second clutch 200. In each pair of first extensions 1003, 2003 as defined above, a rivet 1005 is intended to pass through an assembly hole 1004 in a first extension 1003 of the outer disk carrier 106 of the assembly 1 formed by the first clutch 100 and through an assembly hole 2004 in a first extension 2003 of the outer disk carrier 206 of the assembly 2 formed by the second clutch 200.

It will be clear that, to assemble the two assemblies 1, 2 to one another by means of the first extensions 1003, 2003, the rivet 1005 of each pair of first extensions 1003, 2003 extends radially beyond the assembly holes 1004, 2004 so as to clamp together the first extensions 1004, 2004 of each pair.

In accordance with this first embodiment of the invention, the assembly device 3 further comprises each of the rivets 1005 as described above. The assembly device 3 more particularly comprises each pair of first extensions 1003, 2003 and each rivet 1005 intended to cooperate with said pair.

In a variant of the invention the assembly holes 1004, 2004 of the first extensions 1003, 2003 are threaded holes each configured to receive an assembly screw.

Figure 3:
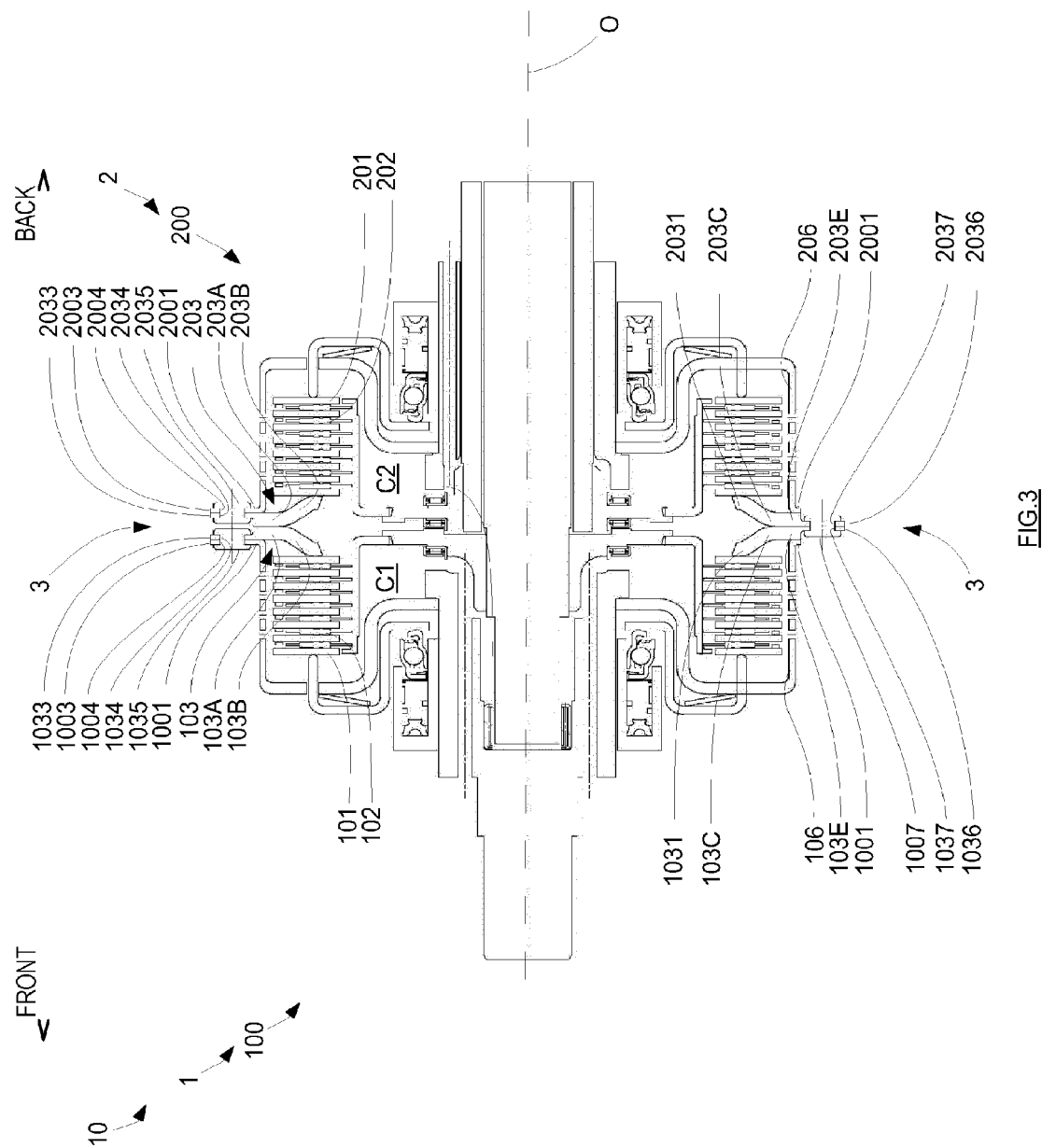
FIG. 3 shows a sectional view of a second embodiment in which the reaction members are assembled to their corresponding disk carrier by first angular sectors in corresponding relationship with the first extensions of the disk carriers and the disk carriers of the assemblies are assembled to one another by second angular sectors of the reaction members.
Figure 4:
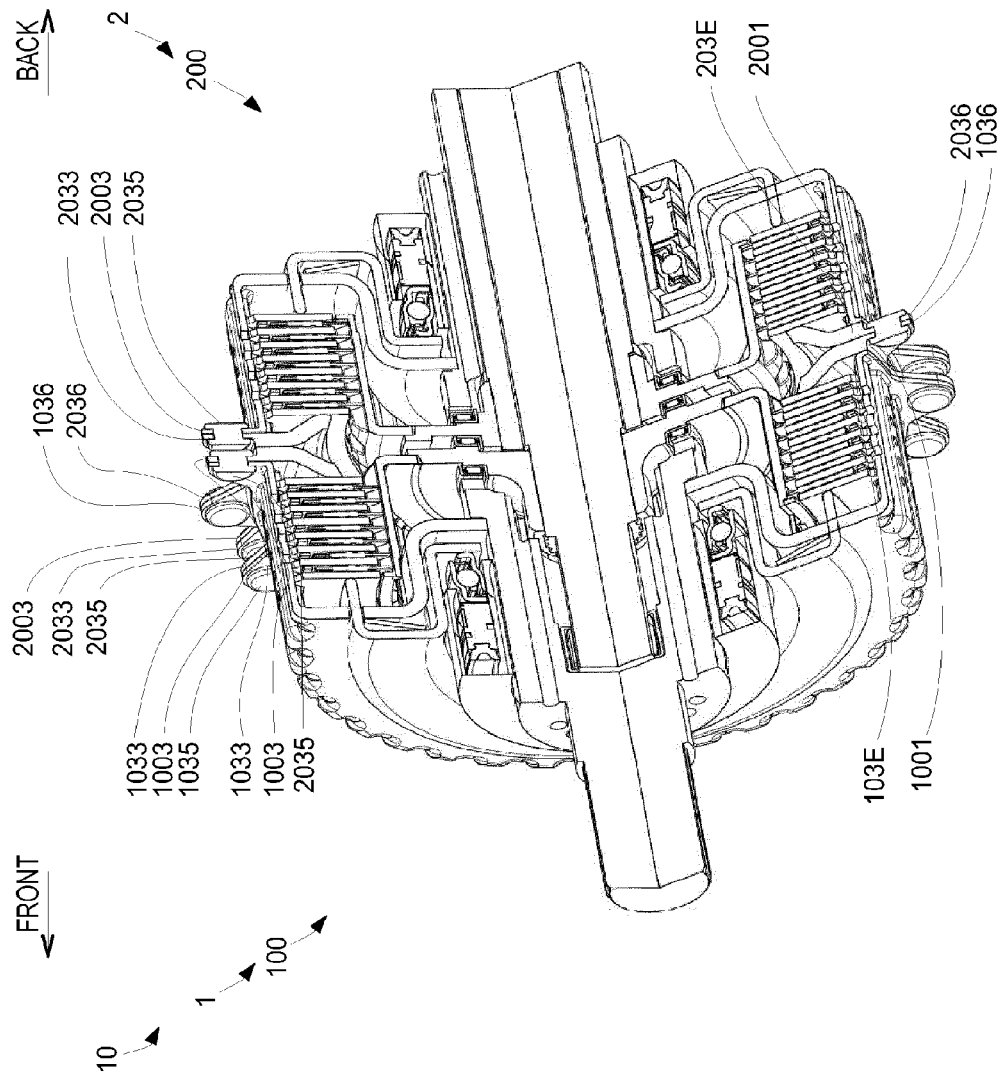
FIG. 4 shows a perspective view of the second embodiment from FIG. 3.

In accordance with a second embodiment shown in FIGS. 3 and 4 and in contrast to the first embodiment last described, the reaction member 103, 203 of each assembly 1, 2 extends in part radially beyond the respective cavity C1, C2 of the outer disk carrier 106, 206 of the corresponding assembly 1, 2. In this configuration, the reaction members 103, 203 are not housed in their respective cavities C1, C2 and are no longer prevented from moving axially in the direction of the other clutch by an axial stop abutment. In this configuration and in contrast to the first embodiment the reaction members 103, 203 bear axially on one another, at least at the level of their first part 103, 203.

The reaction members 103, 203 are also of circular shape about the axis O and are annular at their center.

The reaction members 103, 203 are mounted on the outer disk carriers 106, 206 of the first and second clutches 100, 200.

Each reaction member 103, 203 more particularly comprises a first part 103A, 203A extending radially mainly outside of the cavity C1, C2, i.e. beyond the peripheral edge 1001, 2001 of the corresponding outer disk carrier 106, 206, and a second part 103B, 203B situated inside the cavity C1, C2, i.e. on the inside relative to the peripheral edge 1001, 2001 of the corresponding outer disk carrier 106, 206. Each reaction member 103, 203 formed by the first part 103A, 203A and the second part 103B, 203B then has an S-shape section. It will be noted that the first part 103A, 203A and the second part 103B, 203B respectively of each reaction member 103, 203 have a common end 103C, 203C. The second part 103B, 203B of each reaction member 103, 203 of the assemblies 1, 2, comprises an inner radial edge 1031, 2031 that extends axially and radially in the direction of the clutch 100, 200 of said corresponding assembly 1, 2. The first part 103A, 203A and the second part 203B, 203B of each reaction member 103, 203 together have an S-shape section.

However, the invention is not limited to this configuration. In this instance, the first part 103A, 203A and the second part 203B, 203B of each reaction member 103, 203 could together have an L-shape section. In this case, differently from the first part 103A, 203A and the second part 103B, 203B described above for this second embodiment, the second part 103B, 203B of each reaction member 103, 203 of the assemblies 1, 2 would comprise an inner radial edge 1031, 2031 that extends axially in the direction of the clutch 100, 200 of said corresponding assembly 1, 2.

In the configuration shown in FIGS. 3 and 4, the second part 103B, 203B of each reaction member 103, 203 has an inner radial edge 1031, 2031 bearing axially against the stack of coupling disks 101, 201 and friction disks 102, 202 of the corresponding clutch 100, 200. As shown here, the second part 103B of the reaction member 103 of the first clutch 100 extends axially and radially toward the front consecutively to the first part 103A of the reaction member 103 of the first clutch 100 while the second part 203B of the reaction member 203 of the second clutch 200 extends axially and radially toward the rear consecutively to the first part 203A of the reaction member 203 of the second clutch 200. It will therefore be clear that the second parts 103B, 203B extend away from one another.

In the same manner as in the first embodiment, the peripheral edges 1001, 2001 of the assemblies 1, 2 are disposed so as to face one another; the peripheral edges 1001, 2001 of the assemblies 1, 2 are more particularly symmetrical with respect to one another.

The first parts 103A, 203A of the reaction members 103, 203 are configured so that they bear both axially against one another and axially via an outer radial edge 103E, 203E against the respective peripheral edge 1001, 2001 of the corresponding outer disk carrier 106, 206. As shown here, the outer radial edge 103E, 203E of a reaction member 103, 203 is radially flush with the peripheral edge 1001, 2001 of the corresponding outer disk carrier 106, 206.

To fasten the reaction members 103, 203 to their respective outer disk carrier 106, 206, the first part 103A, 203A of each reaction member 103, 203 comprises the outer radial edge 103E, 203E from which extend radially outwards any number of first angular sectors 1033, 2033 that are preferably circumferentially distributed around the axis O.

In the same manner as in the first embodiment and as shown in FIGS. 3 and 4, the outer disk carrier 106 of the first clutch 100 comprises first extensions 1003. In the identical manner, the outer disk carrier 206 of the second clutch 200 comprises first extensions 2003. The first extensions 1003, 2003 of the outer disk-carriers 106, 206 extend radially outwards beyond the respective peripheral edges 1001, 2001 of the corresponding outer disk-carriers 106, 206. As shown in FIG. 4, the respective first extensions 1003, 2003 of each outer disk carrier 106, 206 are circumferentially distributed around the peripheral edge 1001, 2001 of the corresponding outer disk carrier 106, 206.

By way of example, each outer disk carrier 106, 206 may comprise eight first extensions 1003, 2003.

In the configuration of the second embodiment shown in FIG. 3 or 4, the first part 103A, 203A of the reaction member 103, 203 of at least one assembly 1, 2 is adapted to cooperate with the first extensions 1003, 2003 of the corresponding outer disk carrier 106, 206 in order to assemble the reaction member 103, 203 to its corresponding outer disk carrier 106, 206. Each first angular sector 1033, 2033 of the corresponding reaction member 103, 203 is more particularly configured to cooperate with a first extension 2003 of the corresponding outer disk carrier 106, 206 in order to assemble the reaction member 103, 203 to its corresponding outer disk carrier 106, 206.

It will also be noted that the first angular sectors 1033, 2033 of a reaction member 103, 203 of an assembly 1, 2 are configured to face first extensions 1003, 2003 of the outer disk carrier 106, 206 of the same assembly 1, 2. The first angular sectors 1033, 2033 of a reaction member 103, 203 of an assembly 1, 2 are more particularly configured to bear axially against the first extensions 1003, 2003 of the outer disk carrier 106, 206 of the same assembly 1, 2.

By way of example, each reaction member 103, 203 may comprise eight first angular sectors 1033, 2033 configured to cooperate respectively with the eight first extensions 1003, 2003.

In accordance with this second embodiment of the invention, the assembly device 3 comprises each pair of first angular sector 1033, 2033 and first extension 1003, 2003 constituted by a first angular sector 1033, 2033 of a reaction member 103, 203 of an assembly 1, 2 facing a first extension 1003, 2003 of the outer disk carrier 106, 206 of the same assembly 1, 2.

In each pair of first angular sector 1033, 2033 and first extension 1003, 2003, a rivet 1035, 2035 is intended to pass through an assembly orifice 1034, 2034 formed in a first angular sector 1033, 2033 of the first part 103A, 203A of the reaction member 103, 203 of an assembly 1, 2 and to pass through an assembly hole 1004, 2004 formed in a first extension 1003, 2003 of the outer disk carrier 106, 206 of the same assembly 1, 2. It will be clear that the assembly orifices 1034, 2034 formed in each of the first angular sectors 1033, 2033 of a reaction member 103, 203 of an assembly 1, 2 are in corresponding relationship with the assembly holes 1004, 2004 formed in each of the first extensions 1003, 2003 of the same assembly 1, 2.

The assembly device 3 then enables assembly of each reaction member 103, 203 to its corresponding outer disk carrier 106, 206 with the aid of each of the rivets 1035, 2035 described above for this second embodiment.

It will be clear that to assemble each reaction member 103, 203 to its corresponding outer disk carrier 106, 206, the rivet 1035, 2035 of each pair of first angular sector 1033, 2033 and first extension 1003, 2003 extends radially beyond the assembly orifice 1034, 2034 and the assembly hole 1004, 2004 so as to maintain clamped together the first angular sectors 1033, 2033 and first extensions 1003, 2003 of each pair as described above for this second embodiment.

In the assembled state the first angular sectors 1033, 2033 and the first extensions 1003, 2003 of an assembly 1, 2 face the first angular sectors 1033, 2033 and first extensions 1003, 2003 of the other assembly 1, 2. The assembly orifices 1034, 2034 and the assembly holes 1004, 2004 of an assembly 1, 2 are more particularly in corresponding relationship with the assembly orifices 1034, 2034 and the assembly holes 1004, 2004 of the other assembly 1, 2. It will be clear that the rivets 1035 assembling the reaction member 103 to its outer disk carrier 106 of the assembly 1 formed by the clutch 100 may face rivets 2035 assembling the reaction member 203 to its outer disk carrier 206 of the other assembly 2 formed by the second clutch 200. The rivets 1035, 2035 of the corresponding assembly 1, 2 are nevertheless distant from the rivets 1035, 2035 of the other assembly 1, 2, thanks to the axial setting back of the first angular sectors 1035, 2035 relative to a bearing zone of the first parts 103A, 203A of each assembly 1, 2 against one another.

In accordance with this second embodiment of the invention, the assembly device 3 further comprises each of the rivets 1035, 2035 as described above and participating in the assembly of the reaction members 103, 203 to their disk carriers 103, 206. The assembly device 3 more particularly comprises each pair of first angular sector 1033, 2033 and first extension 1003, 2003 and each rivet 1035, 2035 intended to cooperate with said pair.

In a variant of the invention, the assembly orifices 1034, 2034 of the first extensions 1003, 2003 are threaded holes each configured to receive an assembly screw.

Alternatively, the first angular sectors 1033, 2033 of each first part 103A, 203A and their respective outer radial edge 103E, 203E are in one piece. The first angular sectors 1033, 2033 of each first part 103A, 203A are preferably mounted at their respective peripheral edge 1001, 2001.

It will be noted that in this configuration the assembly device 3 as described above for this second embodiment does not enable assembly of the two assemblies 1, 2 to one another; nevertheless, it participates in assembly the two assemblies 1, 2 to one another as described hereinafter.

To fasten the assemblies 1, 2 to one another, the first part 103A of the reaction member 103 of one assembly 1 is adapted to cooperate with the first part 203A of the reaction member 203 of the other assembly 2, the assembly device 3 comprising the first part 103A, 203A of the reaction member of each assembly. Second angular sectors 1036, 2036 distributed circumferentially around the axis O and extending radially outwards from the outer radial edge 103E, 203E of the corresponding reaction member 103, 203 more particularly enable assembly of the assemblies 1, 2 to one another.

It will be clear that the second angular sectors 1036, 2036 are separate from the first angular sectors 1033, 2033. The first part 103A, 203A of each reaction member 103, 203 therefore comprises both a plurality of first angular sectors 1033, 2033 and a plurality of second angular sectors 1036, 2036. In accordance with this second embodiment, the first angular sectors 1033, 2033 of an assembly 1, 2 are distributed circumferentially around the axis O in alternation with the second angular sectors 1036, 2036 of the same assembly 1, 2.

It will also be clear that the second angular sectors 1036, 2036 of each first part 103A, 203A extend radially outwards from the cavity C1, C2 of their respective assembly 1, 2.

By way of example, each reaction member 103, 203 may comprise eight second angular sectors 1036, 2036.

As shown in FIG. 3 or 4, the first part 103A of the reaction member 103 of the assembly 1 forming the first clutch 100 is adapted to cooperate with the first part 203A of the reaction member 203 of the assembly 2 forming the second clutch 200. The second angular sectors 1036 of the first part 103A of the reaction member 103 of the assembly 1 forming the first clutch 100 are more particularly adapted to cooperate with the second angular sectors 2036 of the first part 203A of the reaction member 203 of the assembly 2 forming the second clutch 200. It will then be clear that in this configuration, the two assemblies 1, 2 are assembled to one another with the aid of their respective reaction member 103, 203.

It will also be noted that the second angular sectors 1036, 2036 of a reaction member 103, 203 of one assembly 1, 2 are configured to face second angular sectors 1036, 2036 of the reaction member 103, 203 of the other assembly 1, 2. The second angular sectors 1036, 2036 of a reaction member 103, 203 of one assembly 1, 2 are more particularly configured to bear axially against the second angular sectors 1036, 2036 of the reaction member 103, 203 of the other assembly 1, 2.

By way of example, the eight second angular sectors 1036 of the reaction member 103 of the assembly 1 forming the clutch 100 are configured to cooperate with the eight second angular sectors 2036 of the reaction member 203 of the assembly 2 forming the second clutch 200.

In accordance with this second embodiment of the invention, the assembly device 3 further comprises each pair of second angular sectors 1036, 2036 constituted by a second angular sector 1036 of the first part 103A of the reaction member 103 of an assembly 1 facing a second angular sector 2036 of the first part 203A of the reaction member 203 of the other assembly 2.

In each pair of second angular sectors 1036, 2036, a rivet 1007 is intended to pass through an assembly orifice 1037, 2037 formed in a second angular sector 1036, 2036 of the first part 103A, 203A of the reaction member 103, 203 of an assembly 1, 2 and to pass through an assembly orifice 1037, 2037 formed in a second angular sector 1036, 2036 of the first part 103A, 203A of the reaction member 103, 203 of the other assembly 1, 2. It will be clear that the assembly orifices 1037, 2037 formed in each of the second angular sectors 1036, 2036 of a reaction member 103, 203 of an assembly 1, 2 are in corresponding relationship with assembly orifices 1037, 2037 formed in each of the second angular sectors 1036, 2036 of a reaction member 103, 203 of the other assembly 1, 2.

The assembly device 3 then enables the assemblies 1, 2 to be assembled to one another by means of the reaction member 103, 203 of each assembly 1, 2, with the aid of each of the rivets 1007 effecting this assembly and described above for this second embodiment.

It will be clear that to assemble the assemblies 1, 2 to one another with the aid of the reaction member 103, 203 of each assembly 1, 2 the rivet 1007 of each pair of second angular sectors 1036, 2036 extends radially beyond the assembly orifices 1037, 2037 of the corresponding pair so as to maintain clamped together the second angular sectors 1036, 2036 of each pair participating in the assembly of the two assemblies 1, 2 as described above for this second embodiment.

It will be clear that in the assembled state the second angular sectors 1036, 2036 of one assembly 1, 2 face second angular sectors 1036, 2036 of the other assembly 1, 2. The assembly orifices 1037, 2037 of the second angular sectors 1036, 2036 of an assembly 1, 2 are more particularly in corresponding relationship with assembly orifices 1037, 2037 of the second angular sectors 1036, 2036 of the other assembly 1, 2.

In accordance with this second embodiment of the invention, the assembly device 3 further comprises each of the rivets 1007 as described above. The assembly device 3 more particularly comprises each pair of second angular sectors 1036, 2036 and each rivet 1007 intended to cooperate with said pair.

It will be clear that in this second embodiment the outer disk carriers 106, 206 of the assemblies 1, 2 are fastened to one another by means of their respective reaction member 103, 203.

In a variant of the invention, each of the assembly orifices 1037, 2037 of the second angular sectors 1036, 2036 are threaded holes each configured to receive an assembly screw.

Alternatively, the second angular sectors 1036, 2036 of each first part 103A, 203A and their respective outer radial edge 103E, 203E are in one piece. The second angular sectors 1036, 2036 of each first part 103A, 203A are preferably mounted on their respective peripheral edge 1001, 2001.

In accordance with one particular variant of the invention, the reaction members 103, 203 of the assemblies 1, 2 are in one piece produced by molding for example. It will be clear that in this case the part produced by molding and forming the reaction members may be machined on the side so as to be configured dimensionally with the clutch mechanism 10.

Figure 5:
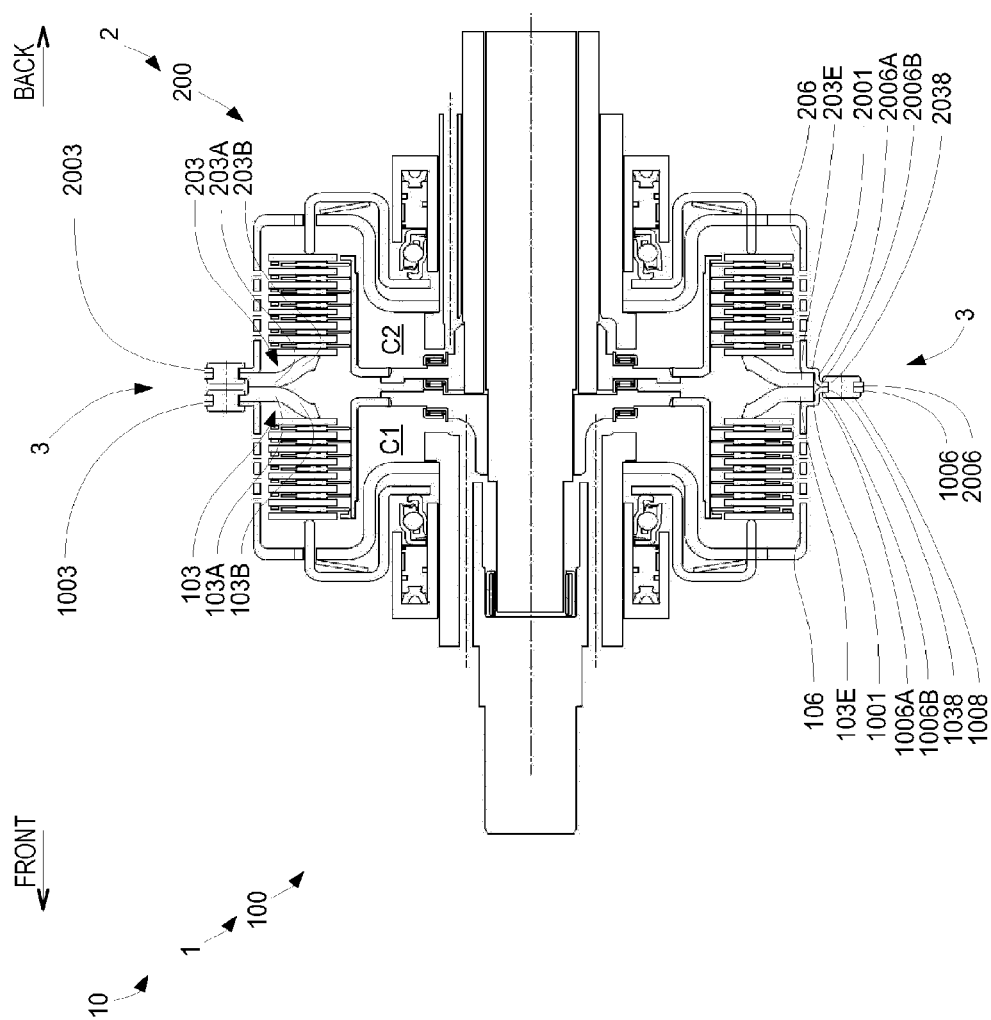
FIG. 5 shows a sectional view of a third embodiment in which the reaction members are assembled to their corresponding disk carrier by first angular sectors in corresponding relationship with the first extensions of the disk carriers and the disk carriers of the assemblies are assembled to one another by second extensions of the disk carriers.
Figure 6:
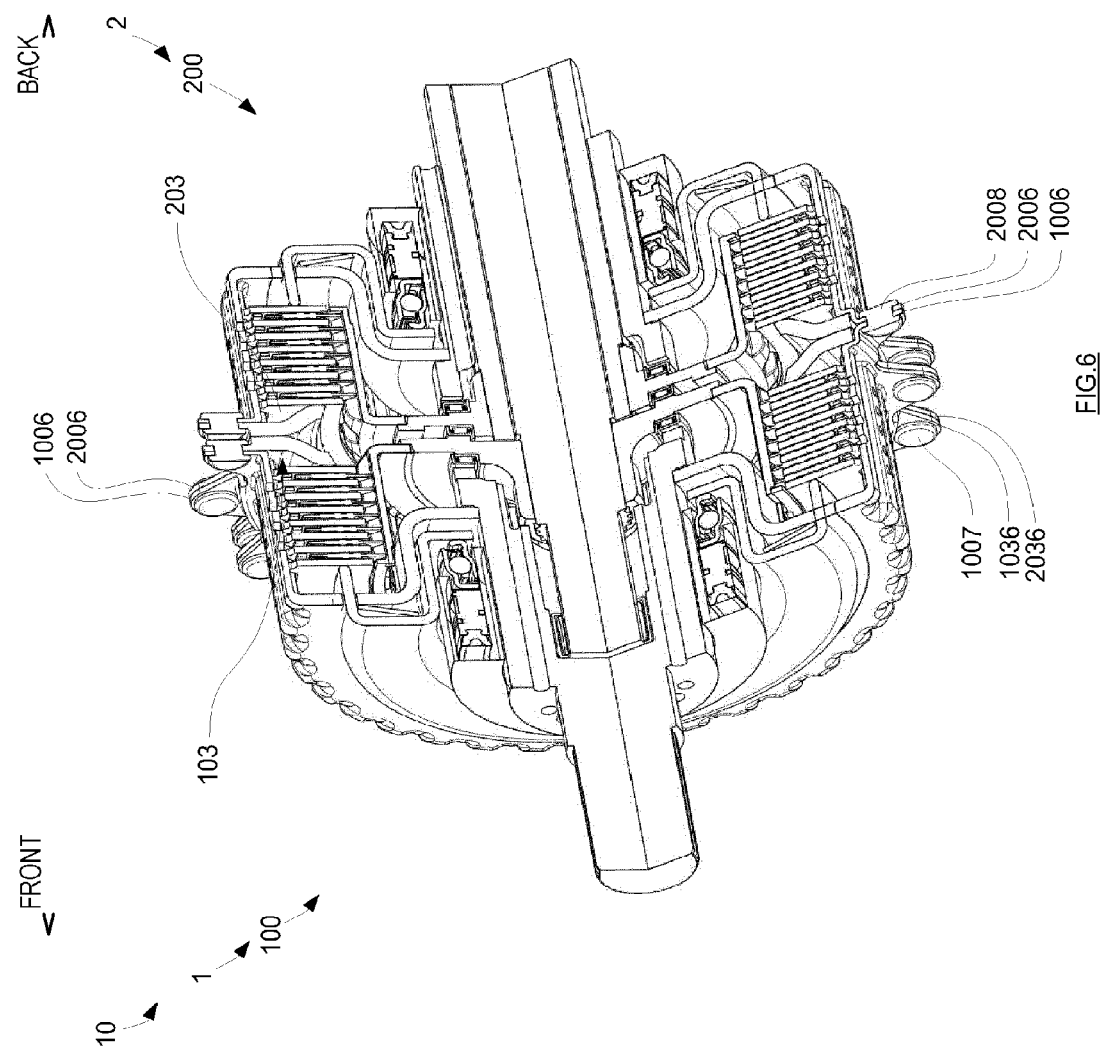
FIG. 6 is a perspective view of the third embodiment from FIG. 5.

In accordance with a third embodiment shown in FIGS. 5 and 6 and in an identical manner to the second embodiment last described the reaction member 103, 203 of each assembly 1, 2 extends in part radially beyond the respective cavity C1, C2 respective of the outer disk carrier 106, 206 of the corresponding assembly 1, 2.

The reaction members 103, 203 of this third embodiment are similar to those of the second embodiment. The reaction members 103, 203 are in particular mounted on the outer disk carriers 106, 206 of the first and second clutches 100, 200.

In the same manner, each reaction member 103, 203 comprises a first part 103A, 203A extending radially mainly outside the cavity C1, C2, that is to say beyond the peripheral edge 1001, 2001 of the corresponding outer disk carrier 106, 206, and a second part 103B, 203B situated inside the cavity C1, C2, that is to say inside the peripheral edge 1001, 2001 of the corresponding outer disk carrier 106, 206. It will be clear that the first parts 103A, 203A and the second parts 103B, 203B are in a configuration identical to that of the second embodiment.

In the same manner as in the second embodiment the peripheral edges 1001, 2001 of the assemblies 1, 2 are disposed so as to face one another; the peripheral edges 1001, 2001 of the assemblies 1, 2 are more particularly symmetrical with respect to one another.

The reaction members 103, 203 are fastened to their respective outer disk carrier 106, 206 in an identical manner to the second embodiment described above.

It will be understood that the variants envisaged in the second embodiment may be applied to this third embodiment.

In an identical manner to the second embodiment, to assemble the assemblies 1, 2 to one another the first part 103A of the reaction member 103 of one assembly 1 is adapted to cooperate with the first part 203A of the reaction member 203 of the other assembly 2. In the same manner, the reaction members 103, 203 are connected to one another by their respective second angular sectors 1036, 2036.

It will therefore be clear that, in a similar manner to the second embodiment, the outer disk carriers 106, 206 of the assemblies 1, 2 are fastened to one another by means of their reaction member 103, 203. However, in contrast to the second embodiment, in this third embodiment the outer disk carriers 106, 206 of the assemblies 1, 2 are moreover fastened to one another by direct contact with one another.

As shown in FIGS. 5 and 6, to produce this direct contact the outer disk carrier 106, 206 of each assembly 1, 2 comprises second extensions 1006, 2006. The second extensions 1006, 2006 of each outer disk carrier 106, 206 extend beyond the peripheral edge 1001, 2001 of the outer disk carrier 106, 206 of the corresponding assembly 1, 2. It will be clear that the second extensions 1003, 2003 of the outer disk-carriers 106, 206 moreover extend from the respective peripheral edges 1001, 2001 of the corresponding outer disk-carriers 106, 206. As shown here the respective second extensions 1006, 2006 of each outer disk carrier 106, 206 are distributed angularly around the peripheral edge 1001, 2001 of the corresponding outer disk carrier 106, 206. It will be understood that the respective second extensions 1006, 2006 of each outer disk carrier 106, 206 are regularly circumferentially distributed around the axis O.

Each second extension 1006, 2006 comprises a first portion 1006A, 2006A and a second portion 1006B, 2006B adapted to assemble the assemblies 1, 2 to one another. It will be noted that the second portion 1006B, 2006B of each second extension 1006, 2006 is consecutive to the first portion 1006A, 2006A of the same second extension 1006, 2006. In other words, the first portion 1006A, 2006A and the second portion 1006B, 2006B of the same second extension 1006, 2006 share a common edge. As shown here, the first portion 1006A, 2006A of each second extension 1006B, 2006B of one assembly 1, 2 extends axially from the peripheral edge 1001, 2001 in the direction of a first portion 1006A, 2006A of a second extension 1006B, 2006B of the other assembly 1, 2. Moreover, the first part 103A, 203A of the reaction member 103, 203 of each assembly 1, 2 has its outer radial edge 103E, 203E bearing radially against each of the first portions 1006A, 2006A of the second extensions 1006, 2006 of the outer disk carrier 106, 206 of the same assembly 1, 2. The second portion 1006B, 2006B of each second extension 1006, 2006 extends radially outwards from the first portion 1006A, 2006A of the same second extension 1006, 2006.

It will be clear that the second extensions 1006, 2006 are separate from the first extensions 1003, 2003. The peripheral edge 1001, 2001 of the outer disk carrier 106, 206 of each assembly 1, 2 comprises both a plurality of first extensions 1003, 2003 and a plurality of second extensions 1006, 2006. In accordance with this second embodiment the first extensions 1003, 2003 of an assembly 1, 2 are distributed circumferentially around the axis O alternating with the second extensions 1006, 2006 of the same assembly 1, 2.

It will also be clear that the second extensions 1006, 2006 of each disk carrier 106, 206 extend radially outside the cavity C1, C2 of their respective assembly 1, 2.

As shown in FIG. 5 or 6 the outer disk carrier 106 of the assembly 1 forming the first clutch 100 is adapted to cooperate with the outer disk carrier 206 of the assembly 2 forming the second clutch 200. The second extensions 1006 of the outer disk carrier 106 of the assembly 1 forming the first clutch 100 are more particularly adapted to cooperate with the second extensions 2006 of the outer disk carrier 206 of the assembly 2 forming the second clutch 200. It will be then be clear that in this configuration the two assemblies 1, 2 are assembled to one another both with the aid of their respective reaction member 103, 203 and with the aid of their respective outer disk carrier 106, 206.

It will also be noted that the second portions 1006B, 2006B of the second extensions 1006, 2006 of an outer disk carrier 106, 206 of one assembly 1, 2 are configured to face the second portions 1006B, 2006B of the second extensions 1006, 2006 of the outer disk carrier 106, 206 of the other assembly 1, 2. The second portions 1006B, 2006B of the second extensions 1036, 2036 of an outer disk carrier 106, 206 of one assembly 1, 2 are more particularly configured to bear axially against the second portions 1006B, 2006B of the second extensions 1006, 2006 of the outer disk carrier 106, 206 of the other assembly 1, 2.

By way of example, eight second extensions 1006 of the outer disk carrier 106 of the assembly 1 forming the first clutch 100 may be configured to cooperate via their second portions 1006B with eight second extensions 2006 of the outer disk carrier 206 of the assembly 2 forming the second clutch 200 with the aid of their second portions 2006B.

In accordance with this third embodiment of the invention the assembly device 3 further comprises each pair of second extensions 1006, 2006 consisting of a second extension 1006 of the outer disk carrier 106 of the assembly 1 forming the first clutch 100 facing a second extension 2006 of the outer disk carrier 206 of the assembly 2 forming the second clutch 200.

In each pair of second extensions 1006, 2006 a rivet 1008 is intended to pass through an assembly orifice 1038, 2038 formed in a second portion 1006B, 2006B of a second extension 1006, 2006 of the outer disk carrier 106, 206 of an assembly 1, 2 and to pass through an assembly orifice 1038, 2038 formed in a second portion 1006B, 2006B of a second extension 1006, 2006 of the outer disk carrier 106, 206 of the other assembly 1, 2. It will be clear that the assembly orifices 1038, 2038 formed in the second portions 1006B, 2006B of the second extensions 1006, 2006 of the outer disk carrier 106, 206 of one assembly 1, 2 are in corresponding relationship with assembly orifices 1038, 203 formed in the second portions 1006B, 2006B of the second extensions 1006, 2006 of the outer disk carrier 106, 206 of the other assembly 1, 2.

The assembly device 3 then enables completion of the assembly of the assemblies 1, 2 to one another by means of the outer disk carrier 106, 206 of each assembly 1, 2, with the aid of each of the rivets 1008 producing this assembly configuration and described above for this third embodiment.

It will be clear that in the assembled state the second extensions 1006, 2006 of one assembly 1, 2 face the second extensions 1006, 2006 of the other assembly 1, 2. The assembly orifices 1038, 2038 of the second portions 1006B, 2006B of the second extensions 1006, 2006 of one assembly 1, 2 are more particularly in corresponding relationship with the assembly orifices 1038, 2038 of the second extensions 1006, 2006 of the other assembly 1, 2.

In accordance with this third embodiment of the invention the assembly device 3 further comprises each of the rivets 1008 as described above and participating in the assembly of the outer disk-carriers 106, 206 to one another. The assembly device 3 more particularly comprises each pair of second extensions 1006, 2006 and each rivet 1008 intended to cooperate with said pair.

It will be clear that in this third embodiment the assemblies 1, 2 are fastened to one another by means of their respective reaction member 103, 203 and by means of their respective outer disk carrier 106, 206.

In a variant of the invention each of the assembly orifices 1038, 2038 of the second portions 1006B, 2006B second extensions 1006, 2006 are threaded holes each configured to receive an assembly screw.

Alternatively, the second extensions 1006, 2006 of each outer disk carrier 106, 206 and their respective outer radial edge 103E, 203E are in one piece. The second extensions 1006, 2006 of each outer disk carrier 106, 206 are preferably mounted on their respective peripheral edge 1001, 2001.

Figure 7:
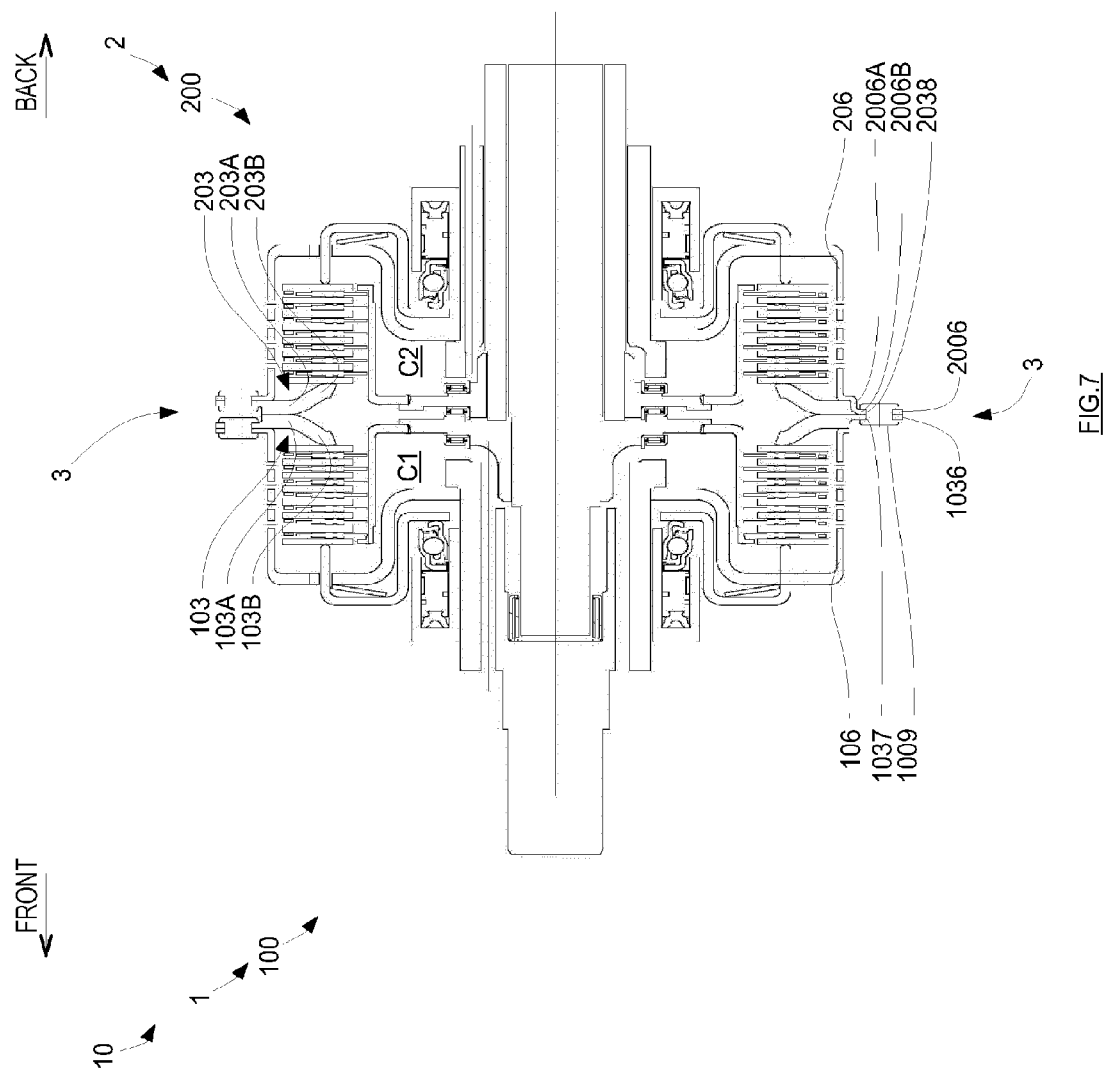
FIG. 7 shows a sectional view of a fourth embodiment in which the reaction members are assembled to their corresponding disk carrier by first angular sectors in corresponding relationship with first extensions of the disk carriers and in which the disk carrier of one assembly is assembled to the reaction member of the other assembly respectively by second extensions of the disk carrier of the corresponding assembly and second angular sectors of the reaction member of the corresponding assembly.

In accordance with a fourth embodiment shown in FIG. 7 and in an identical manner to the second and third embodiments last described the reaction member 103, 203 of each assembly 1, 2 extends in part radially beyond the respective cavity C1, C2 of the outer disk carrier 106, 206 of the corresponding assembly 1, 2

The reaction members 103, 203 of this fourth embodiment are similar to those of the second or third embodiment. The reaction members 103, 203 are in particular mounted on the outer disk carriers 106, 206 of the first and second clutches 100, 200.

In the same manner, each reaction member 103, 203 comprises a first part 103A, 203A extending radially mainly outside the cavity C1, C2, that is to say beyond the peripheral edge 1001, 2001 of the corresponding outer disk carrier 106, 206, and a second part 103B, 203B situated inside the cavity C1, C2, that is to say inside relative to the peripheral edge 1001, 2001 of the corresponding outer disk carrier 106, 206. It will be clear that the first parts 103A, 203A and the second parts 103B, 203B are in a configuration identical to that of the second or third embodiment.

In the same manner as in the second and third embodiments the peripheral edges 1001, 2001 of the assemblies 1, 2 are disposed so as to face one another; the peripheral edges 1001, 2001 of the assemblies 1, 2 are more particularly symmetrical with respect to one another.

The reaction members 103, 203 are fastened to their respective outer disk carriers 106, 206 in an identical manner to the second and third embodiments described above.

In the same manner, it will be clear that the variants envisaged in the second embodiment may be applied to this fourth embodiment.

In the identical manner to the second and third embodiments, to assemble the assemblies 1, 2 to one another the first part 103A of the reaction member 103 of one assembly 1 is adapted to cooperate with the first part 203A of the reaction member 203 of the other assembly 2. In the same manner, the reaction members 103, 203 are connected to one another by means of their respective second angular sectors.

It will therefore be clear that, in a similar manner to the second and third embodiments, the outer disk carriers 106, 206 of the assemblies 1, 2 are fastened to one another by means of their reaction member 103, 203. However, in contrast to the third embodiment, in this fourth embodiment an external disk carrier 106, 206 of one assembly 1, 2 is moreover fastened to with the reaction member 103, 203 of the other assembly 1, 2 by direct contact therewith.

To fasten an outer disk carrier 106, 206 of one assembly 1, 2 to a reaction member 103, 203 of the other assembly 1, 2, the outer disk carrier 106, 206 of one assembly 1, 2 comprises second extensions 1006, 2006, as described for the third embodiment described in detail above and intended to cooperate with other second angular sectors 1036, 2036 of the reaction member 103, 203 of the other assembly 1, 2, as described for the third embodiment described in detail above.

It will also be clear that the second angular sectors 1036, 2036 of a reaction member 103, 203 of one assembly 1, 2 intended to cooperate with the second extensions 1006, 2006 of the disk carrier 106, 206 of the other assembly 1, 2 are separate from the second angular sectors 1036, 2036 of a reaction member 103, 203 of one assembly 1, 2 intended to cooperate with the second angular sectors 1036, 2036 of a reaction member 103, 203 of the other assembly 1, 2.

As shown in FIG. 7, the reaction member 103 of the assembly 1 forming the first clutch 100 is adapted to cooperate with the outer disk carrier 206 of the assembly 2 forming the second clutch 200. Second angular sectors 1036 of the reaction member 103 of the assembly 1 forming the first clutch 100 are more particularly adapted to cooperate with second extensions 2006 of the outer disk carrier 106 of the assembly 2 forming the second clutch 200. It will be then be clear that in this configuration the two assemblies 1, 2 are assembled to one another both with the aid of their respective reaction member 103, 203 and with the aid of an outer disk carrier 106 of an assembly 1 cooperating with the reaction member 203 of the other assembly 2.

It will also be noted that the second portions 1006B, 2006B of the second extensions 1006, 2006 of an outer disk carrier 106, 206 of one assembly 1, 2 for assembling to the reaction member 103, 203 of the other assembly 1, 2 are configured to face the second angular sectors 1036, 2036 of the reaction member 103, 203 of the other assembly 1, 2 producing the same assembly. These second portions 1006B, 2006B of these second extensions 1036, 2036 are more particularly configured to bear axially against these second angular sectors 1036, 2036.

By way of example, eight second angular sectors 1036 of the reaction member 103 of the assembly 1 forming the first clutch 100 may be configured to cooperate with eight second extensions 2006 of the outer disk carrier 206 of the assembly 2 forming the second clutch 200 with the aid of their second portions 2006B.

In accordance with this fourth embodiment of the invention the assembly device 3 comprises each pair of second angular sector 1036, 2036 of one assembly 1, 2 and second extension 1006, 2006 of the other assembly 1, 2 consisting of a second angular sector 1036 of the reaction member 103, of an assembly 1 forming the first clutch 100 facing a second extension 2006 of the outer disk carrier 206 of the assembly 2 forming the second clutch 200.

In each pair of second angular sector 1036, 2036 of an assembly 1, 2 and second extension 1006, 2006 of the other assembly 1, 2, a rivet 1009 is intended to pass through an assembly orifice 1037, 2037 formed in a second angular sector 1036, 2036 of the first part 103A, 203A of the reaction member 103, 203 of an assembly 1, 2 and to pass through an assembly orifice 1038, 2038 formed in a second portion 1006B, 2006B of a second extension 1006, 2006 of the outer disk carrier 106, 206 of the other assembly 1, 2. In these pairs, as described for this fourth embodiment, it will be clear that the assembly orifices 1037, 2037 formed in the second angular sectors 1036, 2036 of the first part 103A, 203A of the reaction member 103, 203 of one assembly 1, 2 are in corresponding relationship with the assembly orifices 1038, 203 formed in the second portions 1006B, 2006B of the second extensions 1006, 2006 of the outer disk carrier 106, 206 of the other assembly 1, 2.

The assembly device 3 then enables completion of the assembly of the assemblies 1, 2 to one another by means of the outer disk carrier 106, 206 of one assembly 1, 2 and of the reaction member 103, 203 of the other assembly 1, 2 with the aid of each of the rivets 1009 producing this assembly configuration and described above for this fourth embodiment.

In the assembled state the second angular sectors 1036, 2036 of one assembly 1, 2 face the second extensions 1006, 2006 of the other assembly 1, 2. The assembly orifices 1037, 2037 of the second angular sectors 1036, 2036 of one assembly 1, 2 are more particularly in corresponding relationship with the assembly orifices 1038, 2038 of the second extensions 1006, 2006 of the other assembly 1, 2.

According to this fourth embodiment of the invention the assembly device 3 further comprises each of the rivets 1009, as described above and participating in the assembly of an outer disk carrier 106, 206 of one assembly 1, 2 with the reaction member 103, 203 of the other assembly 1, 2. The assembly device 3 more particularly comprises each pair of second angular sector 1036, 2036 of one assembly 1, 2 and second extension 1006, 2006 of the other assembly 1, 2 and each rivet 1009 intended to cooperate with said pair.

In this fourth embodiment it will be clear that the assemblies 1, 2 are fastened to one another by means of their respective reaction member 103, 203 and by means of an outer disk carrier 106, 206 of one assembly 1, 2 cooperating with the reaction member 103, 203 of the other assembly 1, 2.

In a variant of the invention each of the assembly orifices 1037, 2037 of the second angular sectors 1036, 2036 of one assembly 1, 2 and each of the assembly orifices 1038, 2038 of the second portions 1006B, 2006B of the second extensions 1006, 2006 configured to cooperate with one another are threaded holes each configured to receive an assembly screw.

Figure 8:
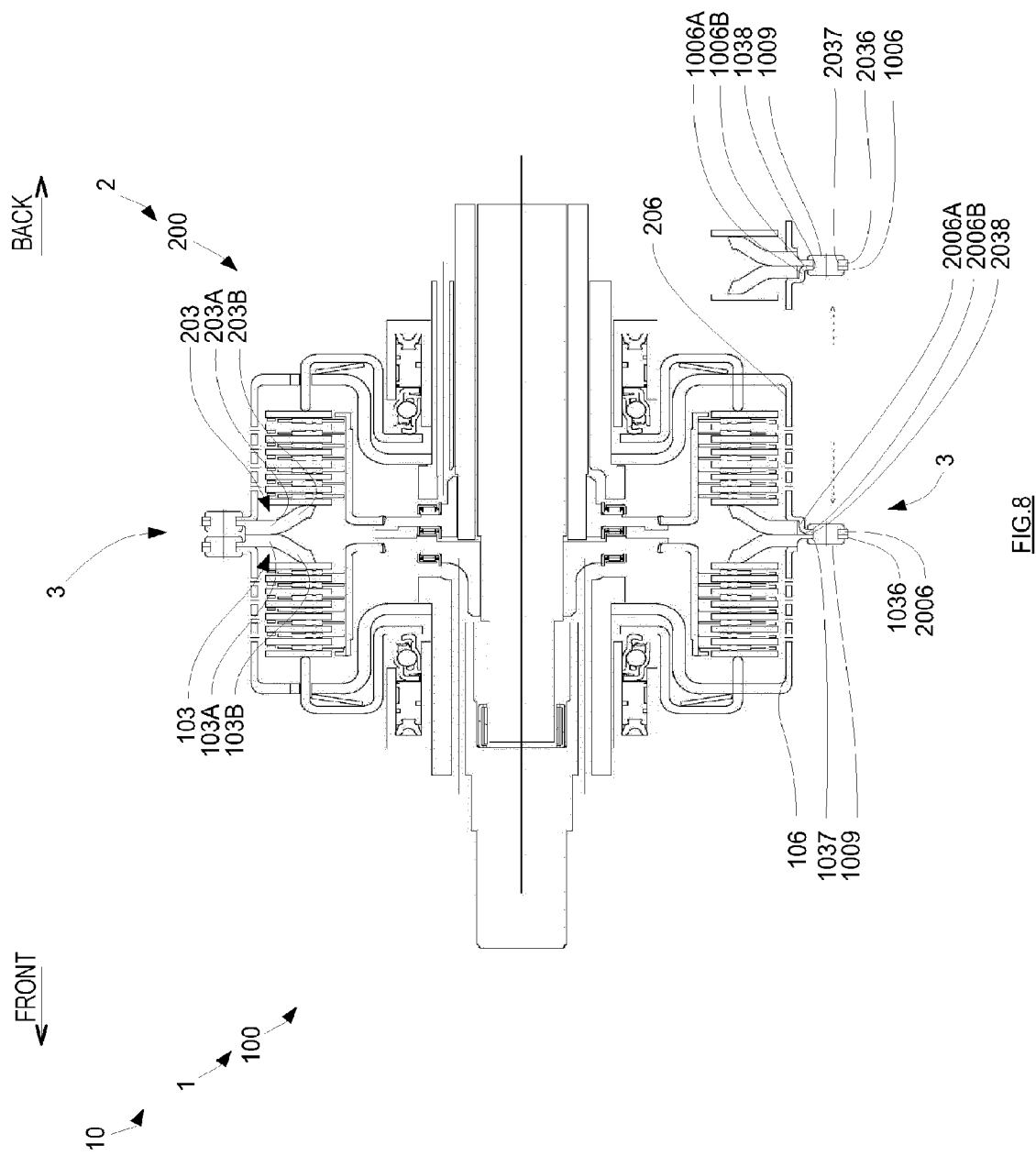
FIG. 8 shows a perspective view of a variant of the fourth embodiment from FIG. 7 in which each disk carrier of an assembly is assembled to the reaction member of the other assembly respectively by second extensions of the disk carrier of the corresponding assembly and second angular sectors of the reaction member of the corresponding assembly.

In accordance with a particular variant of this fourth embodiment shown in FIG. 8 the outer disk carrier 106, 206 of each assembly 1, 2 is fastened to a reaction member 103, 203 of the other assembly 1, 2. To this end the outer disk carrier 106, 206 of each assembly 1, 2 comprises other second extensions 1006, 2006 as described for the third embodiment described in detail above and intended to cooperate with other second angular sectors 1036, 2036 of the reaction member 103, 203 of the other assembly 1, 2 as described for the third embodiment described in detail above.

It will be clear that the second extensions 1006, 2006 of an outer disk carrier 106, 206 of each assembly 1, 2 intended to cooperate with the second angular sectors 1036, 2036 of the reaction member 103, 203 of the other assembly 1, 2 are separate from the second extensions 1006, 2006 of a disk carrier 106, 206 of an assembly 1, 2 intended to cooperate with the second extensions 1006, 2006 of the disk carrier 106, 206 of the other assembly 1, 2.

It will also be clear that the second angular sectors 1036, 2036 of each reaction member 103, 203 of one assembly 1, 2 intended to cooperate with the second extensions 1006, 2006 of the disk carrier 106, 206 of the other assembly 1, 2 are separate from the second angular sectors 1036, 2036 of a reaction member 103, 203 of an assembly 1, 2 intended to cooperate with the second angular sectors 1036, 2036 of a reaction member 103, 203 of the other assembly 1, 2.

As shown in FIG. 8 the reaction member 103 of the assembly 1 forming the first clutch 100 is adapted to cooperate with the outer disk carrier 206 of the assembly 2 forming the second clutch 200 and the reaction member 203 of the assembly 2 forming the second clutch 200 is adapted to cooperate with the outer disk carrier 106 of the assembly 1 forming the first clutch 100. Second angular sectors 1036 of the reaction member 103 of the assembly 1 forming the first clutch 100 are more particularly adapted to cooperate with second extensions 2006 of the outer disk carrier 206 of the assembly 2 forming the second clutch 200 and, in alternation, second angular sectors 2036 of the reaction member 203 of the assembly 2 forming the second clutch 200 are adapted to cooperate with second extensions 1006 of the outer disk carrier 106 of the assembly 1 forming the first clutch 100. It will be then be clear that in this configuration the two assemblies 1, 2 are assembled to one another both with the aid of their respective reaction member 103, 203 and with the aid of the outer disk carrier 106, 206 of each assembly 1, 2 cooperating with the reaction member 103, 203 of the other assembly 2.

By alternation is meant that a pair of second angular sector 1036 of the assembly 1 forming the first clutch 100 and second extension 2006 of the other assembly 2 forming the second clutch 200 is disposed circumferentially around the axis O in alternation with a pair of second angular sector 2036 of the assembly 2 forming the second clutch 200 and second extension 1006 of the other assembly 1 forming the first clutch 100.

Figure 9:
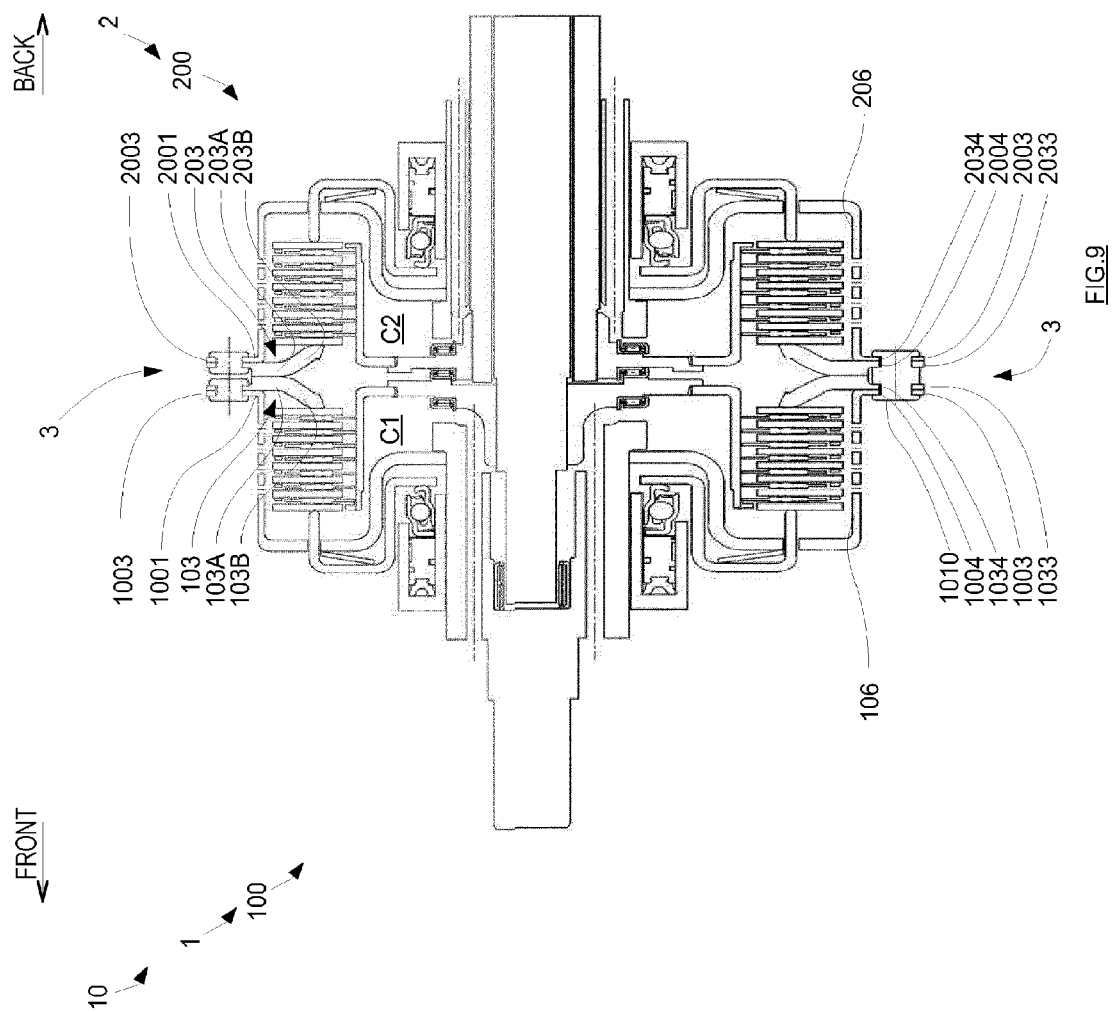
FIG. 9 shows a sectional view of a fifth embodiment in which the reaction members of each assembly are assembled to one another and the disk carriers and the reaction members of each assembly are assembled to one another respectively by first extensions of the disk carrier of the corresponding assembly and first angular sectors of the reaction member of the corresponding assembly.

In accordance with a fifth embodiment shown in FIG. 9 and in an identical manner to the second to fourth embodiments last described the reaction member 103, 203 of each assembly 1, 2 extends in part radially beyond the respective cavity C1, C2 of the outer disk carrier 106, 206 of the corresponding assembly 1, 2.

The reaction members 103, 203 of this fifth embodiment are similar to those of the second to fourth embodiments. The reaction members 103, 203 are in particular mounted on the outer disk carriers 106, 206 of the first and second clutches 100, 200.

In the same manner, each reaction member 103, 203 comprises a first part 103A, 203A extending radially mainly outside the cavity C1, C2, that is to say beyond the peripheral edge 1001, 2001 of the corresponding outer disk carrier 106, 206, and a second part 103B, 203B situated inside the cavity C1, C2, that is to say inside the peripheral edge 1001, 2001 of the corresponding outer disk carrier 106, 206. It will be clear that the first parts 103A, 203A and the second parts 103B, 203B are in a configuration identical to that of the second or third embodiment.

In the same manner as in the second to fourth embodiments the peripheral edges 1001, 2001 of the assemblies 1, 2 are disposed so as to face one another; the peripheral edges 1001, 2001 of the assemblies 1, 2 are more particularly symmetrical with respect to one another.

The reaction members 103, 203 are fastened to their respective outer disk carriers 106, 206 in a similar manner to the second to fourth embodiments described above.

In the same manner it will be clear that the variants envisaged for the second embodiment may be applied to this fifth embodiment.

In the identical manner to the second to fourth embodiments, to assemble the assemblies 1, 2 to one another, the first part 103A of the reaction member 103 of one assembly 1 is adapted to cooperate with the first part 203A of the reaction member 203 of the other assembly 2. In the same manner, the reaction members 103, 203 are connected to one another by means of their respective second angular sectors.

It will therefore be clear that in a similar manner to the second to fourth embodiments the outer disk carriers 106, 206 of the assemblies 1, 2 are fastened to one another by means of their reaction member 103, 203. As described in detail for the second embodiment the first angular sectors 1033, 2033 and the first extensions 1003, 2003 of one assembly 1, 2 face the first angular sectors 1033, 2033 and the first extensions 1003, 2003 of the other assembly 1, 2. Each pair of first angular sector 1033, 2033 and first extension 1003, 2003 of the same assembly 1, 2 is therefore configured to be disposed facing a pair of first angular sector 1033, 2033 and first extension 1003, 2003 of the other assembly 1, 2.

However, compared to the embodiments described above, in this fifth embodiment and alternating with the configuration of the first extensions 1003, 2003 described in detail for the second embodiment a pair of first angular sector 1033, 2033 and first extension 1003, 2003 of an assembly 1, 2 and a pair of first angular sector 1033, 2033 and first extension 1003, 2003 of the other assembly 1, 2 are configured to receive the same rivet 1010. Thus the same rivet 1010 is intended, in the same assembly 1, 2, to pass through an assembly orifice 1034, 2034 formed in a first angular sector 1033, 2033 of the first part 103A, 203A of the reaction member 103, 203 and an assembly hole 1004, 2004 formed in a first extension 1003, 2003 of the outer disk carrier 106, 206, and then, in the other assembly 1, 2, to pass through an assembly orifice 1034, 2034 formed in a first angular sector 1033, 2033 of the first part 103A, 203A of the reaction member 103, 203 and an assembly hole 1004, 2004 formed in a first extension 1003, 2003 of the outer disk carrier 106, 206.

In this configuration the rivet 1010 enables the disk carrier 106, 206 and the reaction members 103, 203 of each assembly 1, 2 to be fastened to one another by direct contact.

It will be clear that to ensure correct assembly of the assemblies 1, 2 to one another each rivet 1010 described in this fifth embodiment extends radially beyond the assembly holes 1004, 2004 so as to maintain the first angular sectors 1033, 2033 and first extensions 1003, 2003 of each pair clamped together as described above for this second embodiment. It will also be noted that the rivets 1010 comprise a shoulder at their center configured and sized so as to come to bear axially against the first angular sectors 1033, 2033 of the same pair as described for this fifth embodiment.

It will be clear that a general feature of the above embodiments is that the pairs of first and/or second extensions described and/or the first and/or second angular sectors described are distributed circumferentially in an alternating manner around the axis O.

Of course, the invention is not limited to the examples that have just been described and numerous modifications may be made to those examples without departing from the scope of the invention. In particular, the various features, forms, variants and embodiments of the invention may be associated with one another in various combinations provided that they are not incompatible or mutually exclusive. In particular all the variants and embodiments described above may be combined with one another.

The invention claimed is:

1. A clutch mechanism configured to be driven in rotation about an axis and comprising:
   two assemblies, each assembly comprising at least:
      an outer disk carrier externally delimiting a cavity;
      a clutch including a stack of coupling disks and friction disks, the stack being housed in the cavity and configured to be driven in rotation about the axis; and
      a reaction member of the outer disk carrier configured to enable compression of the coupling disks against the friction disks in a clutch engaged position of the clutch; and
   an assembly device for assembling the two assemblies, wherein the reaction member includes:
      a first part extending radially outside the cavity and beyond a peripheral edge of the outer disk carrier, and
      a second part situated inside the cavity and inside the peripheral edge of the outer disk carrier.

2. The clutch mechanism according to claim 1, wherein the assembly device assembles the two assemblies using the outer disk carrier of each assembly.

3. The clutch mechanism according to claim 1, wherein the outer disk carrier of each of the two assemblies includes at least one first extension extending radially outwards beyond a peripheral edge of the outer disk carrier, the at least one first extension of the outer disk carrier facing the at least one first extension of another outer disk carrier, the assembly device including the at least one first extension of the outer disk carrier of each of the two assemblies.

4. The clutch mechanism according to claim 3, wherein the assembly device includes at least one rivet or one assembly screw configured to pass through an assembly hole formed in the at least one first extension of the outer disk carrier.

5. The clutch mechanism according to claim 1, wherein the second part of the reaction member includes an inner radial edge that extends axially toward the clutch of said corresponding assembly.

6. The clutch mechanism according to claim 1, wherein the first part of the reaction member includes an outer radial edge from which extend radially outwards first angular sectors distributed circumferentially around the axis, each first angular sector of the reaction member cooperating with a first extension of the corresponding outer disk carrier.

7. The clutch mechanism according to claim 1, wherein the first part of the reaction member of the assembly bears axially against a first part of the reaction member of the other assembly.

8. The clutch mechanism according to claim 1, wherein at least one first angular sector of the first part of the reaction member of at least one assembly is adapted to cooperate with the at least one first extension of the corresponding outer disk carrier in order to assemble the reaction member to the corresponding outer disk carrier.

9. The clutch mechanism according to claim 8, wherein the assembly device includes at least a rivet or one assembly screw configured to pass through an assembly orifice formed in the at least one first angular sector of the first part of the reaction member of the at least one assembly and through an assembly hole formed in a first extension of the outer disk carrier of the at least one assembly.

10. The clutch mechanism according to claim 1, wherein the first part of the reaction member of the assembly is adapted to cooperate with the first part of the reaction member of the other assembly in order to assemble the assemblies to one another, the assembly device including the first part of the reaction member of each of the two assemblies.

11. The clutch mechanism according to claim 10, wherein the first part of the reaction member of the assembly includes second angular sectors distributed circumferentially around the axis, and extend radially outwards from an outer radial edge, each second angular sector of the reaction member of the assembly cooperating with a second angular sector of the reaction member of the other assembly.

12. The clutch mechanism according to claim 11, wherein the assembly device includes at least one rivet or one assembly screw configured to pass through an assembly orifice formed in at least one of the second angular sectors of the first part of the reaction member of the assembly and through an assembly orifice formed in at least one second angular sector of the first part of the reaction member of the other assembly.

13. The clutch mechanism according to claim 12, wherein the first part of the reaction member of at least one assembly is adapted to cooperate both with the first part of the reaction member of the other assembly and with at least one first extension of the outer disk carrier of each assembly in order to assembly the assemblies to one another, the assembly device including the first part of the reaction member of each assembly and the at least one first extension of the outer disk carrier of each assembly.

14. The clutch mechanism according to claim 13, wherein the assembly device includes at least one rivet or one assembly screw configured to pass through an assembly orifice formed in at least one first angular sector of the first part of the reaction member of one assembly and through an assembly orifice formed in at least one first angular sector of the first part of the reaction member of the other assembly.

15. The clutch mechanism according to claim 1, wherein the outer disk carrier includes at least one second extension extending beyond a peripheral edge of the outer disk carrier, and
the at least one second extension includes a first portion and a second portion for assembling the assemblies to one another, the assembly device including the at least one corresponding second extension.

16. The clutch mechanism according to claim 15, wherein the at least one second extension of the outer disk carrier is adapted to cooperate with a second extension of the other outer disk carrier, the assembly device including the corresponding second extensions.

17. The clutch mechanism according to claim 15, wherein the first part of the reaction member includes second angular sectors distributed circumferentially around the axis and extend radially outwards from an outer radial edge, and the at least one second extension of the outer disk carrier of the assembly is adapted to cooperate with at least one second angular sector of the first part of the reaction member of the other assembly, the assembly device including the at least one corresponding second extension and the at least one corresponding second angular sector.

18. The clutch mechanism according to claim 17, wherein the outer radial edge of the first part of the reaction member bears radially against the first portion of the at least one second extension.

19. The clutch mechanism according to claim 16, wherein the assembly device includes at least one rivet or one assembly screw configured to pass through an assembly opening formed in the second portion of the at least one second extension of the outer disk carrier of the assembly and through an assembly opening formed in the second portion of at least one second extension of the outer disk carrier of the other assembly.

20. The clutch mechanism according to claim 17, wherein the assembly device includes at least one rivet or one assembly screw configured to pass through an assembly opening formed in the second portion) of the at least one second extension of the outer disk carrier of the assembly and through an assembly orifice formed in at least one second angular sector of the first part of the reaction member of the other assembly.

* * * * *